(12) United States Patent
MacLean

(10) Patent No.: US 7,748,763 B2
(45) Date of Patent: Jul. 6, 2010

(54) SLIDE OUT FOR A VEHICLE AND A VEHICLE INCLUDING THE SLIDE OUT

(75) Inventor: Colin MacLean, Arundel (AU)

(73) Assignee: Paradise Motor Homes Pty Ltd, Arundel QLD (AU)

(*) Notice: Subject to any disclaimer, the term of this patent is extended or adjusted under 35 U.S.C. 154(b) by 302 days.

(21) Appl. No.: 11/877,064

(22) Filed: Oct. 23, 2007

(65) Prior Publication Data

US 2008/0100094 A1 May 1, 2008

Related U.S. Application Data

(63) Continuation-in-part of application No. 11/142,742, filed on Jun. 1, 2005, now Pat. No. 7,300,086.

(30) Foreign Application Priority Data

Dec. 16, 2004 (AU) .............................. 2004907145

(51) Int. Cl.
*B62D 33/08* (2006.01)

(52) U.S. Cl. ................................................. 296/26.13
(58) Field of Classification Search .............. 296/26.08, 296/26.09, 26.12, 26.13
See application file for complete search history.

(56) References Cited

U.S. PATENT DOCUMENTS 6,623,058 B1 * 9/2003 Crean ...................... 296/26.13

* cited by examiner

*Primary Examiner*—Lori L Lyjak
(74) *Attorney, Agent, or Firm*—Grossman, Tucker, Perreault & Pfleger, PLLC

(57) ABSTRACT

A sliding arrangement (31) for supporting a slide out body member of a slide out on a vehicle body in a way that permits the slide out body member to slide relative to the vehicle body between an expanded and a retracted position. The sliding arrangement (31) includes at least one female member (32) mounted on one of the slide out body member and the vehicle body, the female member (32) having an internal surface defining a passage open at one end. The sliding arrangement (31) further includes a male member (30) slidably received within the open end and passage of the female member (32).

38 Claims, 16 Drawing Sheets

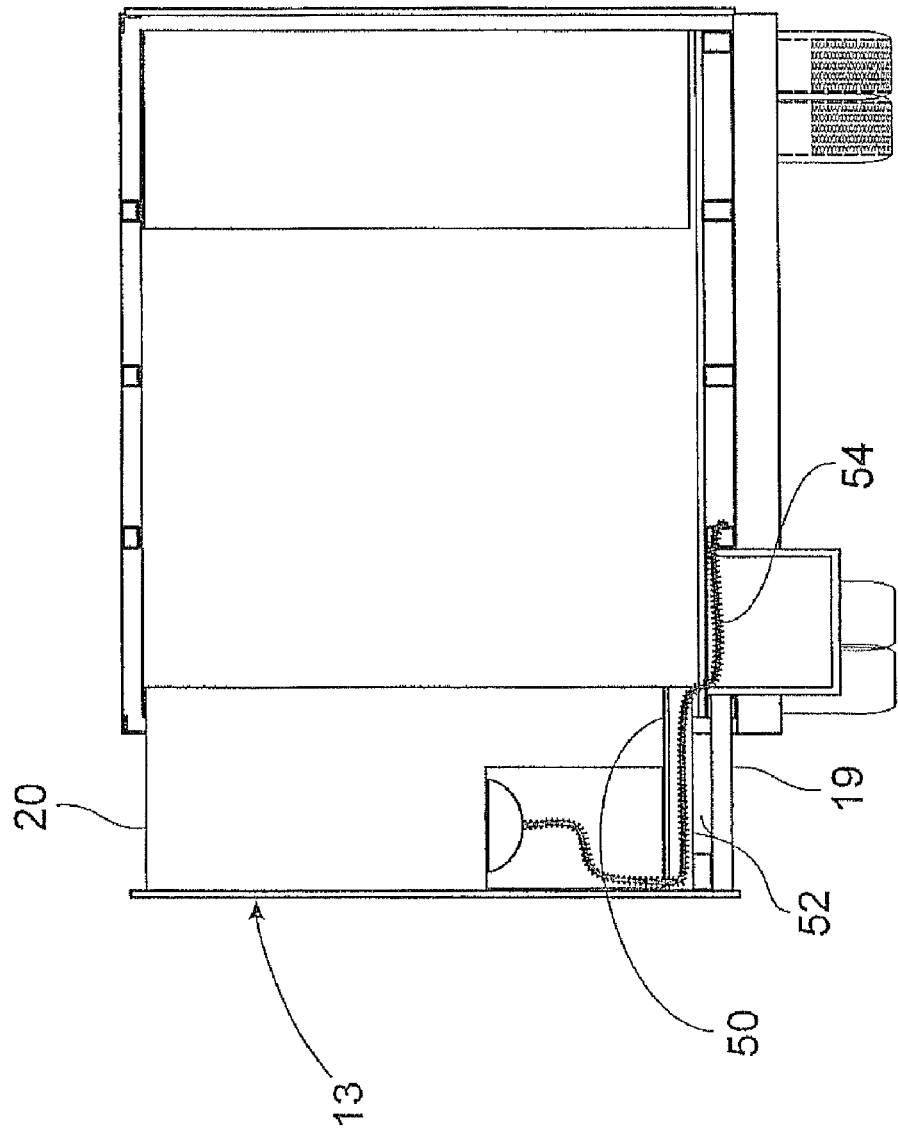

SLIDE OUT FOR A VEHICLE AND A VEHICLE INCLUDING THE SLIDE OUT

RELATED APPLICATION

This application is a continuation in part of pending U.S. patent application Ser. No. 11/142,742, the contents of which are incorporated herein by reference.

FIELD OF THE INVENTION

This invention relates to a sliding arrangement for supporting a slide out body member of a slide out on a vehicle body. The invention also relates to a vehicle including the slide out, and to a slide out for a vehicle.

This invention relates particularly but not exclusively to a slide out for a vehicle that is a recreational vehicle from the group including a motor home, a caravan and a fifth wheeler, and it will be convenient to hereinafter describe the invention with reference to this example application. However it is to be clearly understood that the invention is capable of broader application. For example the invention may also be applied to other passenger carrying vehicles that are used for recreational purposes and can be adapted for people to sleep in them.

Further the invention may also be applied to other vehicles that are used for other purposes. For example the invention may also be applied to vehicles forming offices or workshops that are transported to where they are required and then are deployed as a work shop, office or the like once they are in the location in which they are to be used.

DEFINITIONS

In this application with the term motor home is meant to include a vehicle that has its own motive power and is capable of being driven by a user on a road. The motor home comprises a front seat region and a rear living region behind the front seat region that is adapted to be lived in. For example the rear living region may contain a bed room area, a kitchen area, a lounge area and a bathroom area. Typically the motor home is formed by providing a light commercial van or cab chassis truck that is available in the market place and then building the living region onto or into the chassis of the truck rearward of the front seat region.

In this specification with the term caravan is meant to include a passive vehicle mounted on wheels that does not have its own motive power and is towed to where it is required. The caravan defines an interior space that is fitted out to be lived in. In this specification the term fifth wheeler shall be understood to be a semi-trailer that is pivotally mounted to a towing vehicle above and on the line of the rear axle of the semi trailer that can articulate relative to the towing vehicle. The semi-trailer defines an interior space that is adapted to be lived in.

Further in this application with the term slide out is meant to include at least a portion of the side wall of a vehicle that can be laterally displaced outwardly when the vehicle is not being driven around to create more space and a larger area inside the vehicle. The portion of the side wall that slides out may be rearward of a front seat region of the vehicle.

BACKGROUND TO THE INVENTION

The modification of vehicles to make them suitable for being lived in is known. For example caravans that are towed by powered vehicles such as a family car are well known. A caravan comprises a passive vehicle mounted on wheels that has an interior that has been adapted to be lived in. For example it might typically contain a kitchen and living area and optionally also a bathroom and toilet facility.

The caravan is towed by a car, typically the family car, to where it is required and then it is detached and set up as a place to live in. The presence of caravans in caravan parks near the seas is a ubiquitous feature of Australian society. It offers flexibility in the sense that the caravan can be towed to wherever it is required and it is not fixed to a single destination.

Another example of a recreational vehicle is a motor home. A motor home is a vehicle with an active drive that provides its own motive power on a road. A motor home comprises a front seat region with a driver's seat and driver's controls and an adjacent passenger's seat. It further includes a rear living region behind the driver's seat that has been formed into a living space having amenities enabling it to be lived in. For example it might contain a bed, cupboards, a kitchen area, a storage area for clothes and the like, and a washing area often with a toilet and a basin.

Motor homes are often preferred by couples because they are more compact than caravans and the living area is contained within the primary vehicle. With the change in lifestyles that is occurring and with baby boomers starting to retire the uptake and usage of motor homes has increased markedly and this increase is predicted to continue.

A motor home is made by taking a light commercial van of a type that is commercially available and is purchased off a show room floor and then fitting out the rear of the vehicle to create the living space. For example a light commercial Mercedes™ vehicle can conveniently be used, eg the Mercedes Benz™ Sprinter™ 313 CDI long wheel base van. The interior space of these vehicles is limited. Road regulations typically specify that the maximum width of a vehicle travelling on the roads is 2.5 m.

It will readily be appreciated that the interior space of these vehicles is limited. A constant challenge in designing motor homes is to utilize the limited space that is available in the best possible way thereby to provide a comfortable and functional living environment. While some development and improvement has taken place in this area over the years there is a continuing need to come up with further improvements to further improve utilization of the very limited space. This is particularly so as more and more affluent and discerning customers start using motor homes. A particularly limited dimension in a motor home is the lateral width of the vehicle.

Accordingly it would clearly be advantageous if the motor home could be adapted to be able to create a wider living area when the motor home was parked and transformed into their recreational or camping mode in a way that was trouble free, reliable and did not impose a requirement for additional drive systems which in turn used up more of the precious space within the vehicle body.

SUMMARY OF THE INVENTION

The invention provides a sliding arrangement for supporting a slide out body member of a slide out on a vehicle body in a way that permits the slide out body member to slide relative to the vehicle body between an expanded and a retracted position, which sliding arrangement includes:

at least one female member mounted on one of the slide out body member and the vehicle body, the female member having an internal surface defining a passage open at one end, the passage extending in the direction in which the slide out body member is to slide relative to the vehicle body; and a male member on the other one of the slide out member and the vehicle body, the male member being slidably received within the open end and passage of the female member, the male member having contact surfaces along the length thereof that face outwardly transverse to the longitudinal axis, wherein the contact surfaces of the male member or the internal surface of the female member is coated with a polymer coating having a thickness that is selected to achieve a snug fit of the male member within the passage of the female member, the polymer coating inhibiting transverse movement of the male member within the female member and rattling of the male and female members.

The polymer coating may be applied to the contact surfaces of the male member. The polymer coating may extend along substantially the full length of the contact surfaces of the male member. The polymer coating may extend as a continuous phase along the full length of the male member.

The female member/s may comprise a tube of unitary construction, and the male member/s comprises a complementary rod or tube of unitary construction shaped to be received with the female member/s. The female member may comprise a square tube and the male member comprises a square tube having four contact surfaces, and the polymer coating is applied to each said contact surface.

The polymer coating may be of a polyamide material or a polyurethane material.

Each of the male and female members may be made out of aluminium. The female member/s may be mounted on the vehicle body and the male member/s may be mounted on the slide out member.

The sliding arrangement may include more than two said pairs of engaging male and female members along the length of the slide out member.

The drive means may include at least one of a linear actuator, a hydraulics system including a piston and cylinder, and an air or pneumatic system including an air ram or ratchet and pawl. The drive means may include at least one linear actuator with a shaft operatively mounted onto vehicle body or the slide out body member and a passive actuator element defining an opening through which the shaft of the linear actuator is passed, mounted on to the other of vehicle body and the slide out body member, whereby rotation of the shaft relative to the passive actuator element effects translational displacement of the passive actuator element in an axial direction along the shaft and thereby lateral displacement of the slide out body member relative to the vehicle body.

The shaft of the linear actuator may have the slide out member mounted thereto and is mounted on the vehicle body. The passive actuator element may comprise a nut mounted on the slide out body member in such a way that it is held against rotation by the slide out body member. The linear actuator may include travel limiting means for limiting the travel of the nut along the shaft in each direction, said travel limiting means including limit switches at each end of the range of travel. The drive means may include an electric motor.

The sliding arrangement may include means for energising the motor in the form of a battery.

The sliding arrangement may further include at least one attachment member fixedly attached on an upward facing wall of the male member, the attachment member being for attaching a slide out base to the male member. The slide out base may include a frame onto which the slide out body is mounted. The female member may define a longitudinal slot in its upward facing wall, in which case, the attachment member may be a flange that is shaped and sized to slide along the slot when the male member and female member are telescopically displaced.

According to another aspect of this invention there is provided a vehicle having a slide out, the vehicle comprising:

a vehicle body having a vehicle wall including two side wall sections and defining a vehicle interior;

at least one slide out body member extending across an opening in a side wall section of the vehicle body that is capable of movement between a laterally expanded position during recreational use of the vehicle and a retracted position during use of the vehicle for travel on the roads, the slide out body member having a primary wall portion for covering at least a portion of the side wall section of the vehicle body and the body member also including end walls and a bottom and roof extending transverse to the primary wall portion so that the space defined by the slide out member opens into and forms part of the vehicle interior;

a support for supporting the body member on the body of the vehicle in a way that permits the slide out body member to slide relative to the body of the vehicle between the expanded and retracted positions, the support comprising at least one female member having an internal surface defining a passage open at one end, on one of the slide out body member and the vehicle body, and a male member having a longitudinal axis on the other one of the slide out member and the vehicle body that is slidably received within the open end and passage of the female member, the male member having contact surfaces along the length thereof that face outwardly transverse to the longitudinal axis, wherein the contact surfaces of the male member or the internal surface of the female member is coated with a polymer coating having a thickness that is selected to achieve a snug fit of the male member within the passage of the female member whereby to inhibit transverse movement of the male member within the female member and rattling of the male and female members; and a drive for driving the body member between said expanded and retracted positions on said support means.

The polymer coating may be applied to the contact surfaces of the male member.

The polymer coating may extend along substantially the full length of the contact surfaces of the male member.

The polymer coating may extend as a continuous phase along the full length of the male member.

The female member/s may comprise a tube of unitary construction, and the male member/s may comprise a complementary rod or tube of unitary construction shaped to be received with the female member/s.

The female member may comprise a square tube and the male member may comprise a square tube having four contact surfaces, and the polymer coating may be applied to each said contact surface.

The coating may be a synthetic polymer coating. The polymer coating may be a polyamide material or the polymer coating may be a polyurethane material and may have a thickness of 1 mm.

The male member and/or female member may be made out of a metallic material that is both reasonably light weight and which is strong. Further the metallic material should not be excessively expensive.

The male member may be made out of aluminium. Similarly the female member may be made out of aluminium. Further each of the male member and the female member may be made out of aluminium.

The drive may include a linear actuator, a hydraulics system including a piston and a cylinder, an air or pneumatic system including an air ram, or a ratchet and pawl.

The drive can include at least one linear actuator with a shaft operatively mounted on to the vehicle body or the slide out body member and a passive actuator element defining an opening through which the shaft of the linear actuator is passed, mounted on to the other of the vehicle body or the slide out body member, whereby rotation of the shaft relative to the passive actuator element effects translational displacement of the passive actuator element in an axial direction along the shaft and thereby lateral displacement of the slide out body member relative to the vehicle body.

Each slide out body member may include two said linear actuators, e.g. longitudinally spaced from each other along the length of the primary wall portion. The linear actuators may be positioned towards ends of the primary wall portion.

The linear actuator may include a travel limit for limiting the travel of the nut along the shaft in each direction. The travel limit can include limit switches at each end of the range of travel.

Thus the slide out member can be moved laterally outwardly to the expanded position to increase the living space defined within the vehicle interior when the vehicle is being used for recreational use. The space defined by the slide out member is used to increase the interior space within the vehicle body. The slide out member is returned to the retracted position prior to the vehicle being used for transport again.

In one particular embodiment there are more than two said engaging male and female members along the length of the slide out member, eg four to six said engaging male and female members. The engaging male and female members may be spaced apart from each other, along the length of the slide out member. One said pair of male and female engaging members may be located at or proximate to each end of the slide out member.

The support supports the slide out member on the vehicle body for movement laterally outward into the expanded position on demand. This movement is effected by a linear actuator which is very precise and does not occupy a large amount of space.

The shaft of the linear actuator may be mounted on the vehicle body and the passive actuator element may be a nut which is mounted to the slide out body member. This way the motor for rotating the shaft may be located on the vehicle body.

The passive actuator element may comprise a nut that is mounted on the slide out body member in such a way that it is held against rotation by the slide out body member. The slide out body member may define a non circular formation within which the nut is received whereby to hold it against rotation.

The linear actuator may include an electric motor for rotating the shaft of the linear actuator. Motors for linear actuators would be well known in the art.

The vehicle may include a motor energizer that rotates the shaft of the linear actuator. The motor energizer can include a battery for supplying electrical energy at a certain potential difference. The battery may be the battery in the vehicle that is used to supply energy for ignition and services to the vehicle.

The slide out body member may further include a floor vertically intermediate said bottom and said roof and define a living space between said floor and said roof and a services compartment between said floor and said bottom.

Thus the interior space of the slide out member is vertically divided up into a living space which opens into the vehicle interior and forms part of the amenity of the vehicle which can be occupied by people, and a services compartment beneath the living space. Thus the services compartment is located beneath the floor and is immediately above the bottom of the slide out.

The male and female members described above may be located in the services compartment. Further any other structural members extending between the vehicle body and the slide out member may be located in the services compartment.

The vehicle may include a service connector from the vehicle body to the associated service fittings in the vehicle slide out. The service connector can include one or more flexible conduits, each conduit carrying a service which is located in the services compartment beneath the floor, one end of the conduit being connected to that service on the vehicle body and the other end being connected to that service on the slide out body member.

The services that are provided through the services conduits may include: electricity for energizing appliances and lights, eg 12 V and 240 V, water for washing and cooking, gas for cooking and heating, and drainage for draining water from a kitchen sink, shower and/or a hand basin.

One such flexible conduit may be in the form of a flexible pipe that carries water to the slide out. Another flexible conduit may be in the form of a flexible pipe that carries gas to the slide out. Another such flexible conduit may contain flexible electrical cable for supplying electricity to the slide out member. Another flexible conduit may form or contain a drain pipe that drains waste water from the slide out member.

Each flexible conduit may have one end operatively coupled to a service supply element on the vehicle body and an opposed end operatively coupled to the corresponding service receiving element on the vehicle slide out. Each flexible conduit may have sufficient length to accommodate movement of the slide out member from the retracted to the expanded positions without a tensile stretching force being applied thereto. That is the conduit may have sufficient length that it is not quite fully extended in the expanded position.

The services compartment may be sized to receive the necessary length of the flexible conduit to allow movement between the retracted and expanded conditions for all services. That is the compartment can accommodate with comfort all the extra length of the various service conduits when the slide out member is in the retracted position.

The vehicle may further include a conduit organizer in the services compartment to assist in guiding the conduits to unfold in an organized fashion when the slide out member is moved to the expanded position and to guide the conduits to fold up in an organized fashion when the slide out member is moved back in to the retracted position. The conduit organizer may include a partition member that extends into the services compartment, eg from the primary wall portion.

The partition member may extend parallel to the end walls of the slide out member or transverse to the primary wall portion of the slide out member. Further the partition member may extend from the primary wall portion at least part of the width of the slide out body member in a direction towards the interior of the vehicle body.

The vehicle may include at least one slide out member on each of left and right hand sides of the vehicle. The slide outs on the left and right hand sides of the vehicle may overlap with each other in a longitudinal direction, e.g. to a significant extent.

Thus the vehicle may have slide out members on each of left and right hand sides of the vehicle. This enables both left and right hands sides of the vehicle to be expanded out to increase the living space in the vehicle interior. When the vehicle goes into camping mode the left and right hand slide out members can be expanded into their expanded conditions to create a substantially larger area within the vehicle for use as a living area. An interior space is thereby created which is much wider than that which could otherwise be created in a vehicle with fixed walls that was licensed to travel on public roads.

The vehicle may be a motor home. Instead the vehicle may be a caravan. Further instead the vehicle may be a fifth wheeler.

According to a further another aspect of this invention there is provided a slide out for mounting to a vehicle body, the slide out comprising:

a slide out body member having a primary wall portion for covering over the side of the vehicle and also end walls and a bottom and roof extending transverse away from the primary wall portion in a direction into the vehicle body so as to enclose an interior space of the slide out body member within an interior of the vehicle body, the slide out body member being capable of movement between a laterally expanded position during recreational use of the vehicle and a retracted position during use of the vehicle for travel on the roads;

a support for supporting the body member on the body of the vehicle in a way that permits the slide out body member to slide relative to the body of the vehicle between the expanded and retracted positions, the support comprising at least one female member having an internal surface fining a passage open at one end, on one of the slide out body member and the vehicle body, and a male member having a longitudinal axis on the other one of the slide out member and the vehicle body that is slidably received within the open end and passage of the female member, the male member having contact surfaces along the length thereof that face outwardly transverse to the longitudinal axis, wherein the contact surfaces of the male member or the internal surface of the female member is coated with a polymer coating having a thickness that is selected to achieve a snug fit of the male member within the passage of the female member whereby to inhibit transverse movement of the male member within the female member and rattling of the male and female members; and a drive for driving the body member between said expanded and retracted positions on said support means.

The support may include any one or more of the features of the support defined above according to the first aspect of the invention. In particular the male member may include any one or more of the features defined above in the first aspect of the invention. Specifically the coating on the male member may include any one or more of the features of the coating defined above in the first aspect of the invention.

Further the female member may include any one or more of the features of the female member defined in the first aspect of the invention above.

Yet further the drive may include any one or more of the features of the drive defined in the first aspect of the invention above.

According to yet another aspect of this invention there is provided a vehicle having a slide out. The vehicle includes a vehicle body having a wall including two side wall sections and defining a vehicle interior. At least one slide out body member extends across an opening in a side wall section of the vehicle body that is capable of movement between a laterally expanded position during recreational use of the vehicle and a retracted position during use of the vehicle for travel on the roads. The slide out body member has a primary wall portion for covering at least a portion of the side wall section of the vehicle body and the body member also includes end walls and a bottom and roof extending transverse to the primary wall portion in a direction into the vehicle body so that the space defined by the slide out member opens into and forms part of the vehicle interior. A support supports the body member on the body of the vehicle in a way that permits sliding of the slide out relative to the body of the vehicle between the expanded and retracted positions. A drive moves the body member between said expanded and retracted positions on said support.

The support can include at least two sets of complementary guide rail formations on each of the slide out body member and the vehicle body, eg longitudinally spaced from each other.

The guide rail formations may include a female member defining a passage open at one end on one of the slide out body member and the vehicle body, and a male member that is sized to be received within the open end and passage of the female member on the other of the slide out body member and the vehicle body.

One or more of the female members may be mounted on the vehicle body and one or more of the male members may be mounted on the slide out member. This way the square tube with the open end is mounted on the vehicle body and the smaller male member which is received therein is mounted on the slide out member. This arrangement is also preferred for guiding movement of the slide out member very precisely relative to the vehicle body.

The female member can include a square tube with an open end. The male member can include a length of square rod or square tube. The male and/or female members may be coated with a friction reducing coating to assist sliding movement of the male member relative to the female member.

The coating may be a polymer coating, e.g. a synthetic polymer coating. The coating may be nylon or polyurethane and may have a thickness of 1 mm.

The optional features of each said slide out member have been described above. The following description will look at how the slide out member is incorporated on the vehicle body and also define features of the vehicle body.

The support may include any one or more of the features of the support defined above according to the first aspect of the invention. In particular the male member may include any one or more of the features defined above in the first aspect of the invention. Specifically the coating on the male member may include any one or more of the features of the coating defined above in the first aspect of the invention.

Further the female member may include any one or more of the features of the female member defined in the first aspect of the invention above.

Yet further the drive may include any one or more of the features of the drive defined in the first aspect of the invention above.

The vehicle defined in the broad statement of the invention defines at least one slide out member extending across the side of a vehicle body. However often the vehicle may have slide out members on each of left and right hand sides of the vehicle. This enables both left and right hands sides of the vehicle to be expanded out to increase the living space in the vehicle interior.

Thus when the vehicle goes into camping mode the left and right hand slide out members can be expanded into their expanded conditions to create a substantially larger area within the vehicle for use as a living area. The cabin created is much wider than that which could otherwise be created in a vehicle with fixed walls that was licensed to travel on public roads.

According to another aspect of this invention there is provided a slide out body member for mounting to a vehicle body, the slide out member comprising: a primary wall portion for covering over the side of the vehicle and also end walls and a bottom and roof extending transverse away from the primary wall portion in a direction into the vehicle body so as to enclose an interior space of the slide out member within an interior of the vehicle body, the slide out body member being capable of movement between a laterally expanded position during recreational use of the vehicle and a retracted position during use of the vehicle for travel on the roads; a support for supporting the body member on the body of the vehicle in a way that permits sliding of the slide out relative to the body of the vehicle between the expanded and retracted positions; and a drive for driving the body member between said expanded and retracted positions on said support, the drive comprising a linear actuator with a shaft for operatively mounting to the vehicle body or the slide out body member and a passive actuator element through which the shaft of the linear actuator is passed for operatively mounting to the other of the vehicle body or the slide out body member such that rotation of the shaft relative to the passive element effects translational displacement of the passive element relative to the shaft and the slide out body member relative to the vehicle body.

The slide out body member may include any one or more of the optional features described above in the preceding aspects of the invention.

In particular the support may include any one or more of the features of the support defined above according to the first aspect of the invention.

Yet further the drive may include any one or more of the features of the drive defined in the first aspect of the invention above.

The invention yet further provides a chassis frame forming part of a chassis for a vehicle body onto which a slide out is mountable, which chassis frame includes:

a plurality of frame members forming the chassis frame, at one frame member defining a passage and a open end to form a female member of a sliding arrangement for supporting the slide out slidably on the vehicle body.

The plurality of frame member may include a plurality of parallel longitudinally spaced apart frame members and a plurality of parallel transversely spaced apart frame members. The longitudinal and transverse frame members may all lie within a same plane. Any one or more of the frame members may be formed from a tubular body having an outer open end, which tubular body forms the female member of the sliding arrangement.

The sliding arrangement may include any one or more of the features as herein defined, described, and illustrated.

BRIEF DESCRIPTION OF THE DRAWINGS

FIG. 19 is an end view of the slide out member and the vehicle body showing the arrangement of the services conduits in the services compartment when the slide out member is in the expanded position.

DETAILED DESCRIPTION OF THE PREFERRED EMBODIMENTS

A vehicle having a slide out body member in accordance with this invention may manifest itself in a variety of forms. It will be convenient to hereinafter provide a detailed description of a couple of embodiments of the invention with reference to the accompanying drawings. The purpose of providing this detailed description is to instruct persons having an interest in the subject matter of the invention how to put the invention into practice. It is to be clearly understood however that the specific nature of this detailed description does not supersede the generality of the preceding statements.

Figure 1:
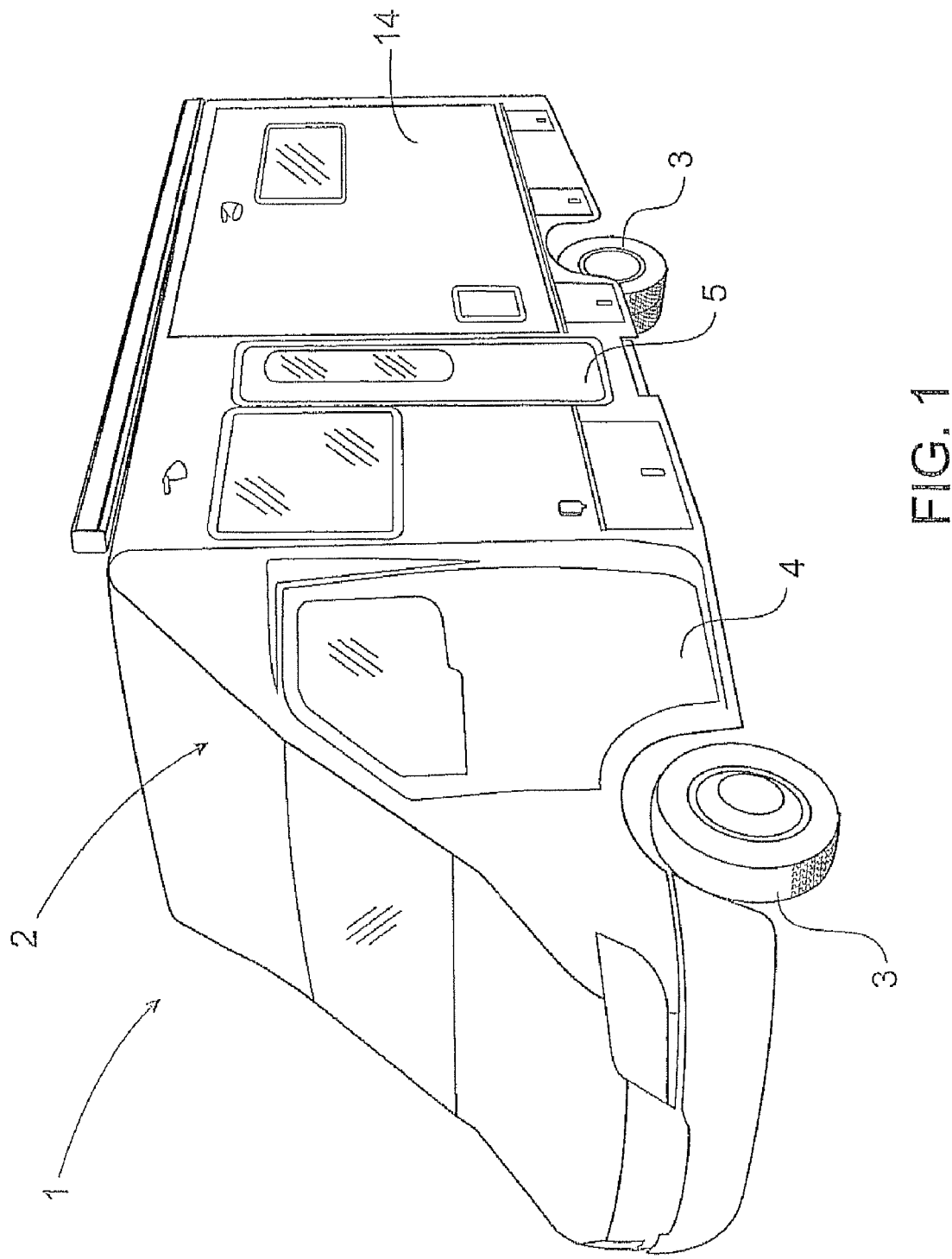
FIG. 1 is a three-dimensional view of a vehicle that is a motor home with left and right side slide out members in their retracted conditions.
Figure 2:
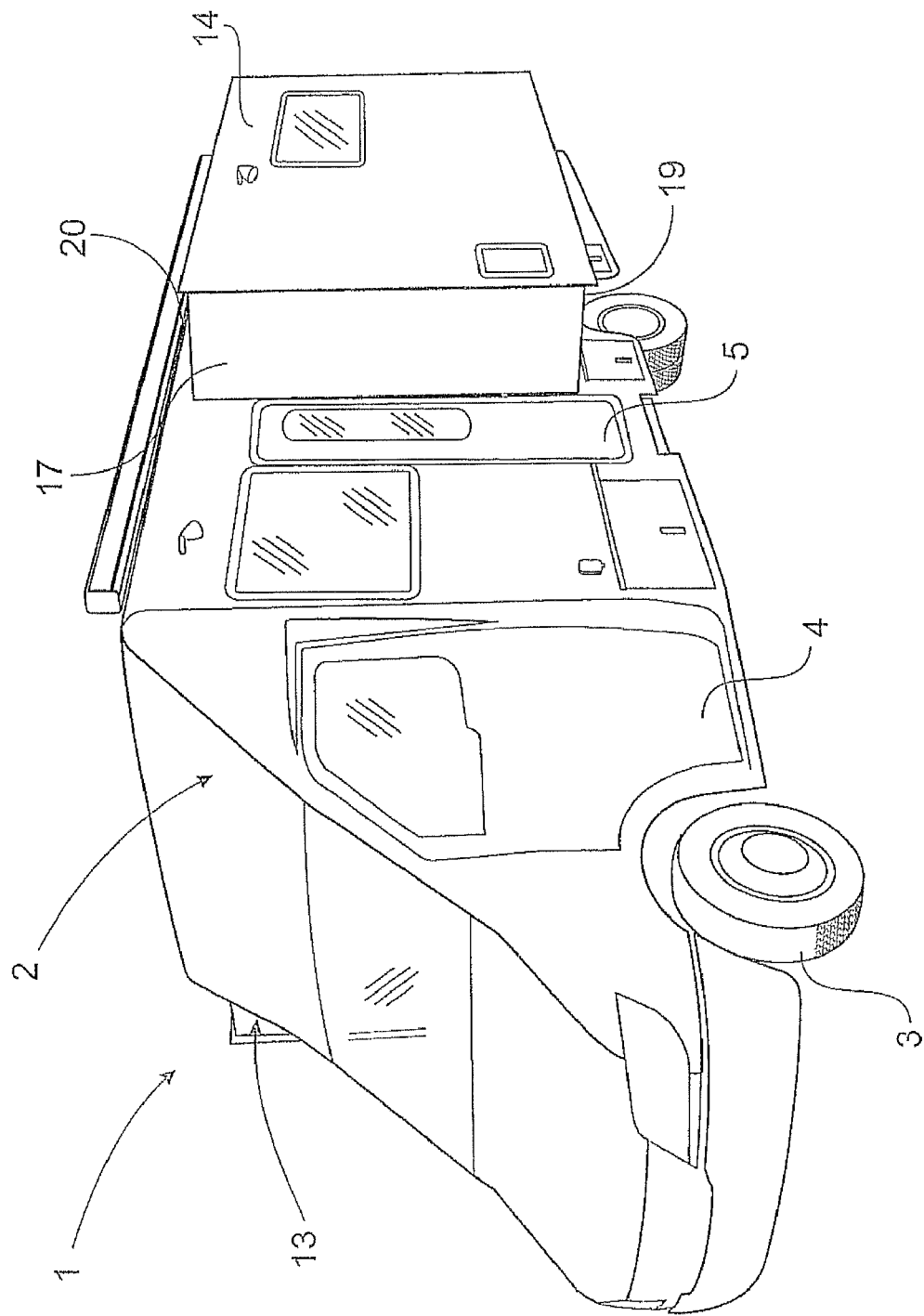
FIG. 2 is a three-dimensional view of the vehicle of FIG. 1 showing the slide out members in their expanded conditions.
Figure 3:
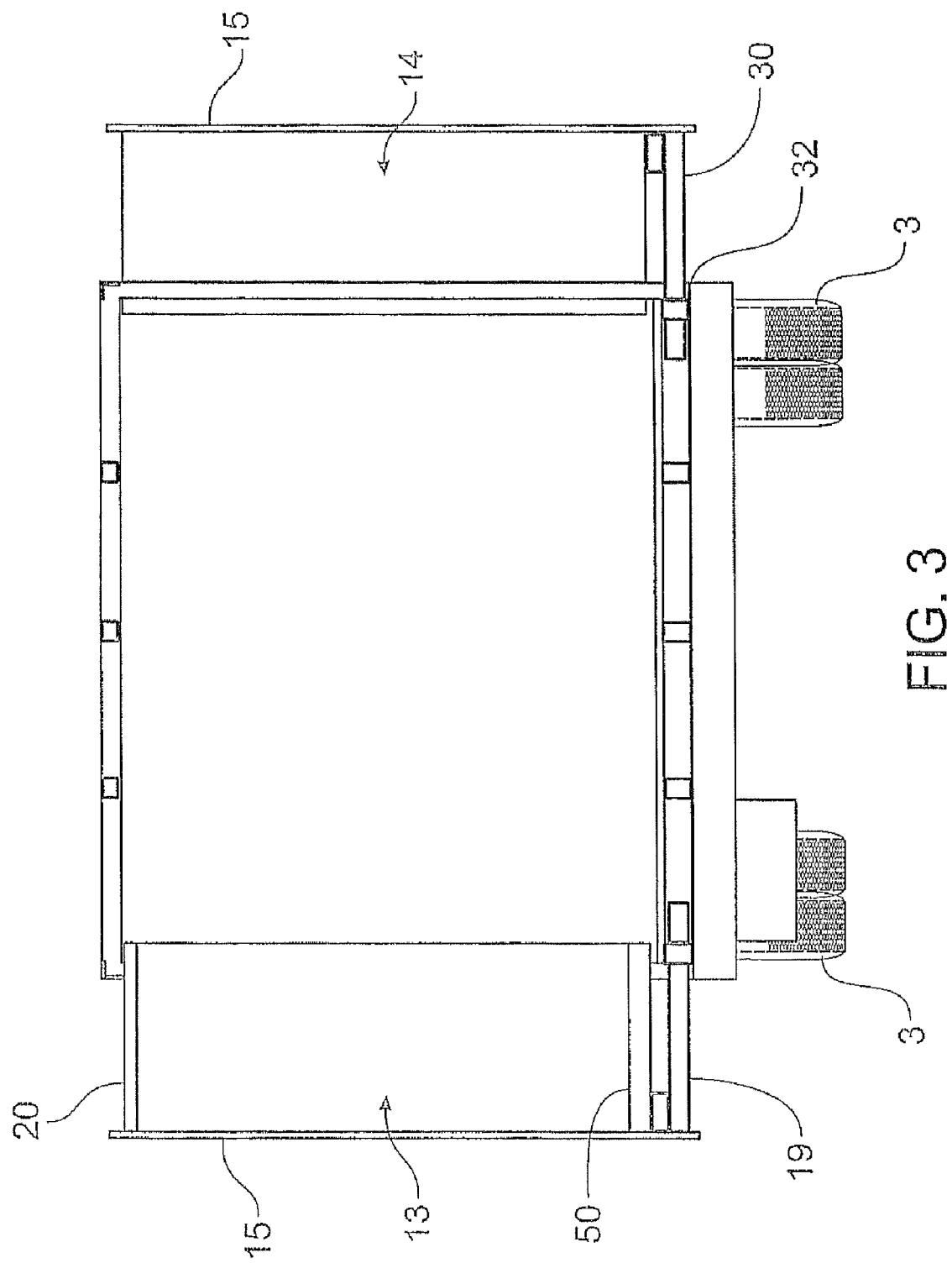
FIG. 3 is a cross-sectional view through the vehicle and the associated slide out members of FIG. 1 with the slide out members in the expanded condition.
Figure 4:
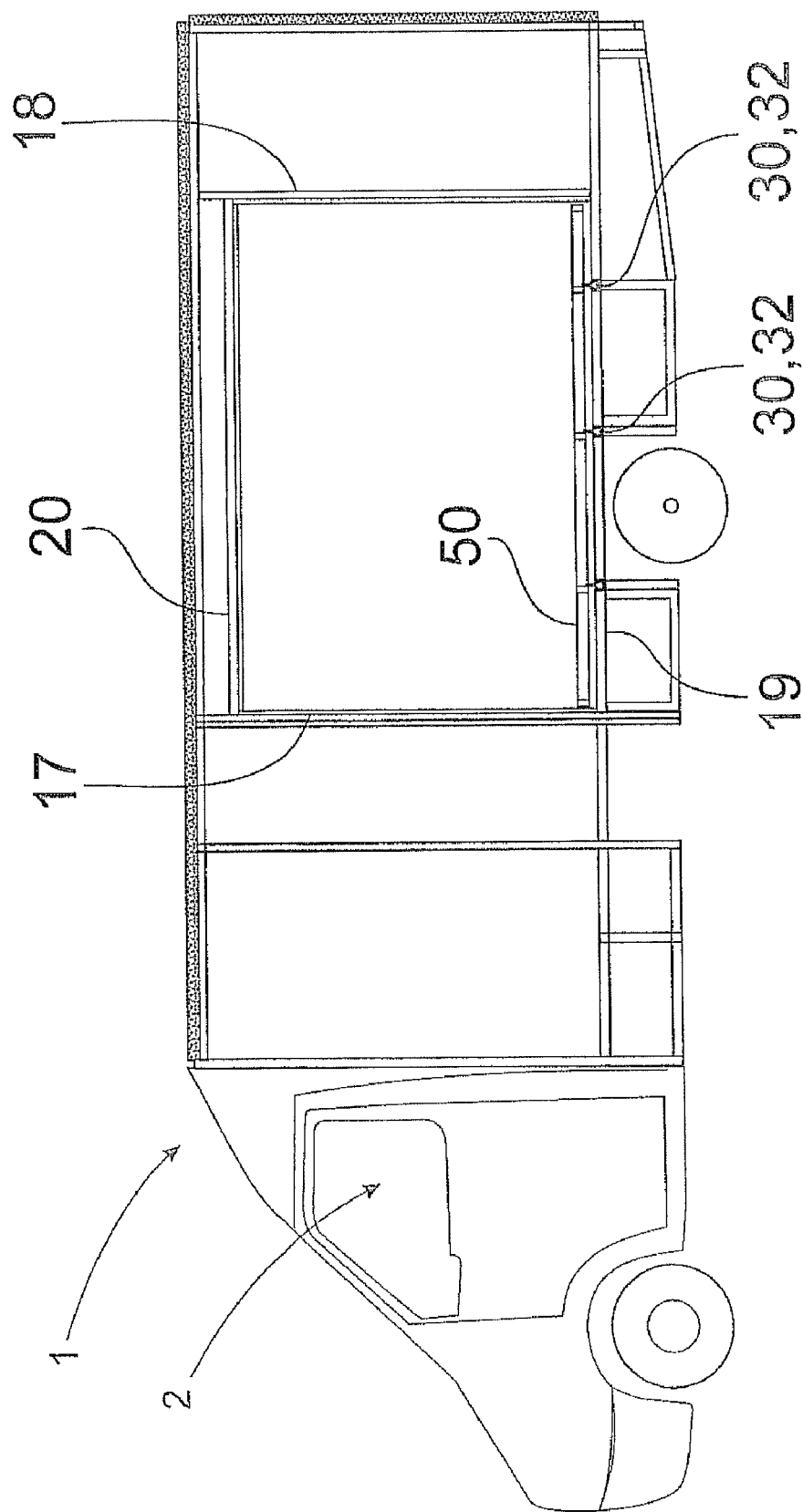
FIG. 4 is a longitudinal section through the vehicle and slide out members of FIG. 1.
Figures 5, 6:
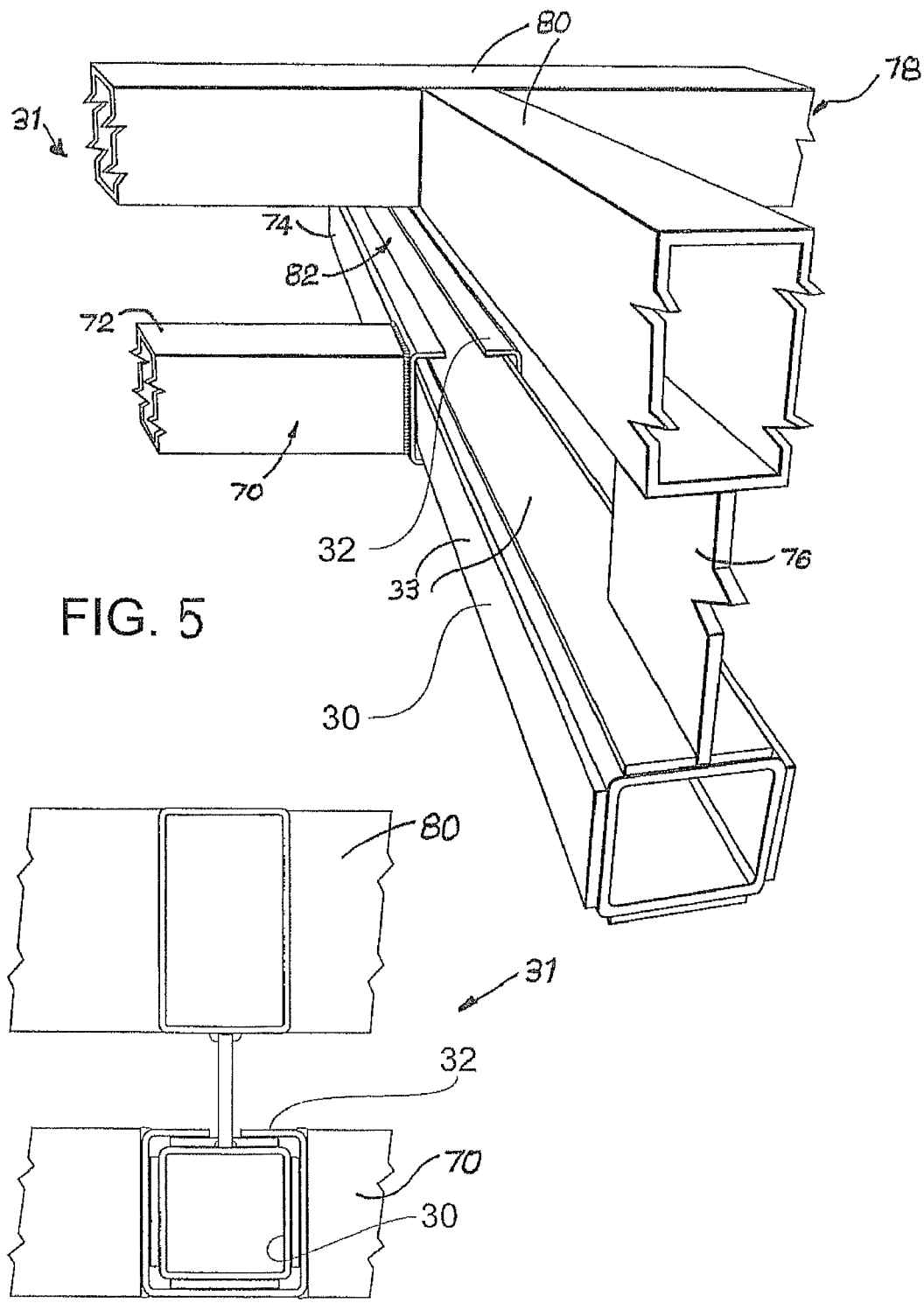
FIG. 5 is a three-dimensional view of the male and female engaging members that forms part of a sliding arrangement for supporting the slide out member on the vehicle body and for guiding it between said retracted and expanded conditions.
FIG. 6 is a cross-sectional view of the male and female engaging members shown in FIG. 5.
Figure 7:
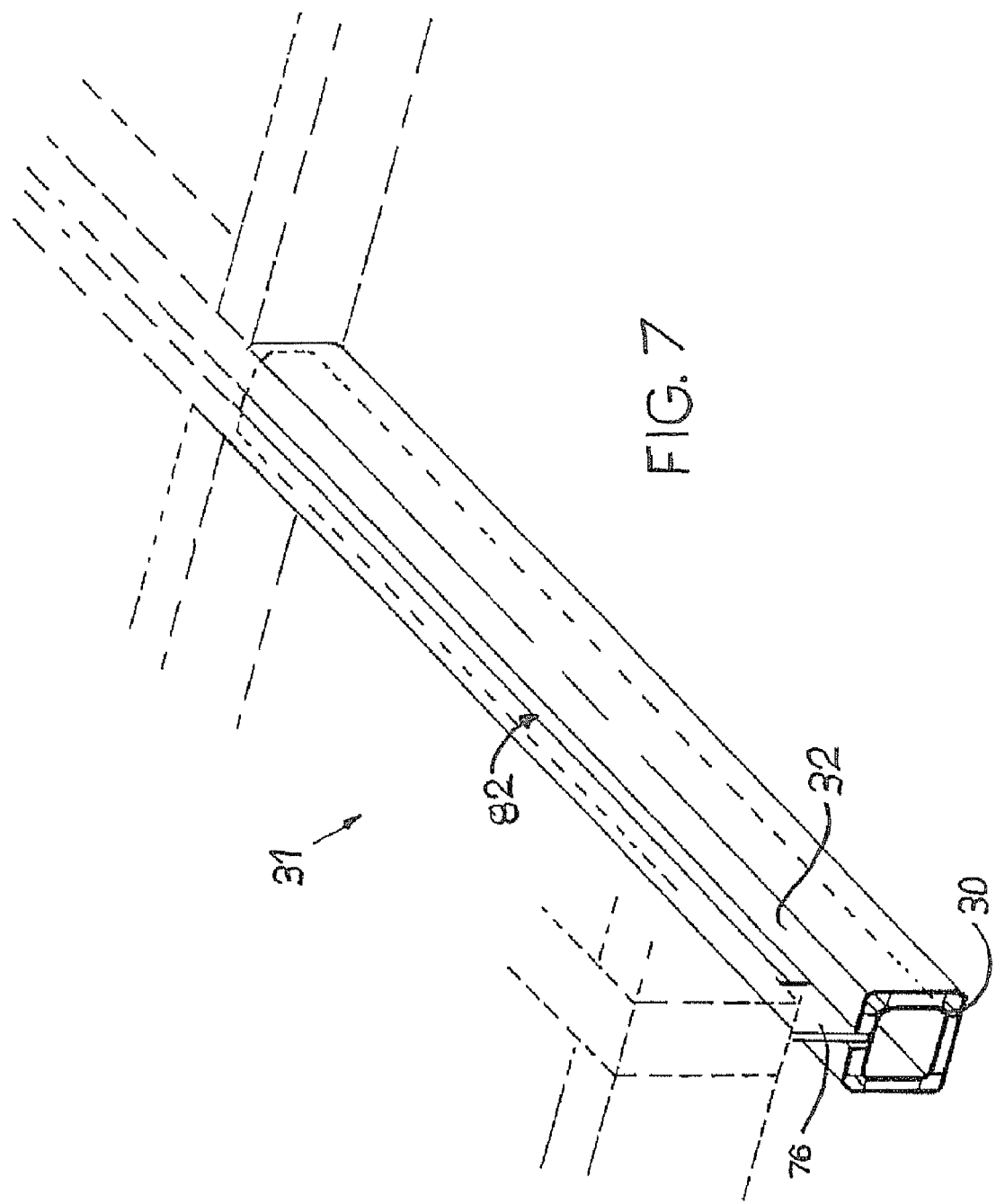
FIG. 7 is a three dimensional view of the male and female members of the slide out in the retracted position.
Figure 8:
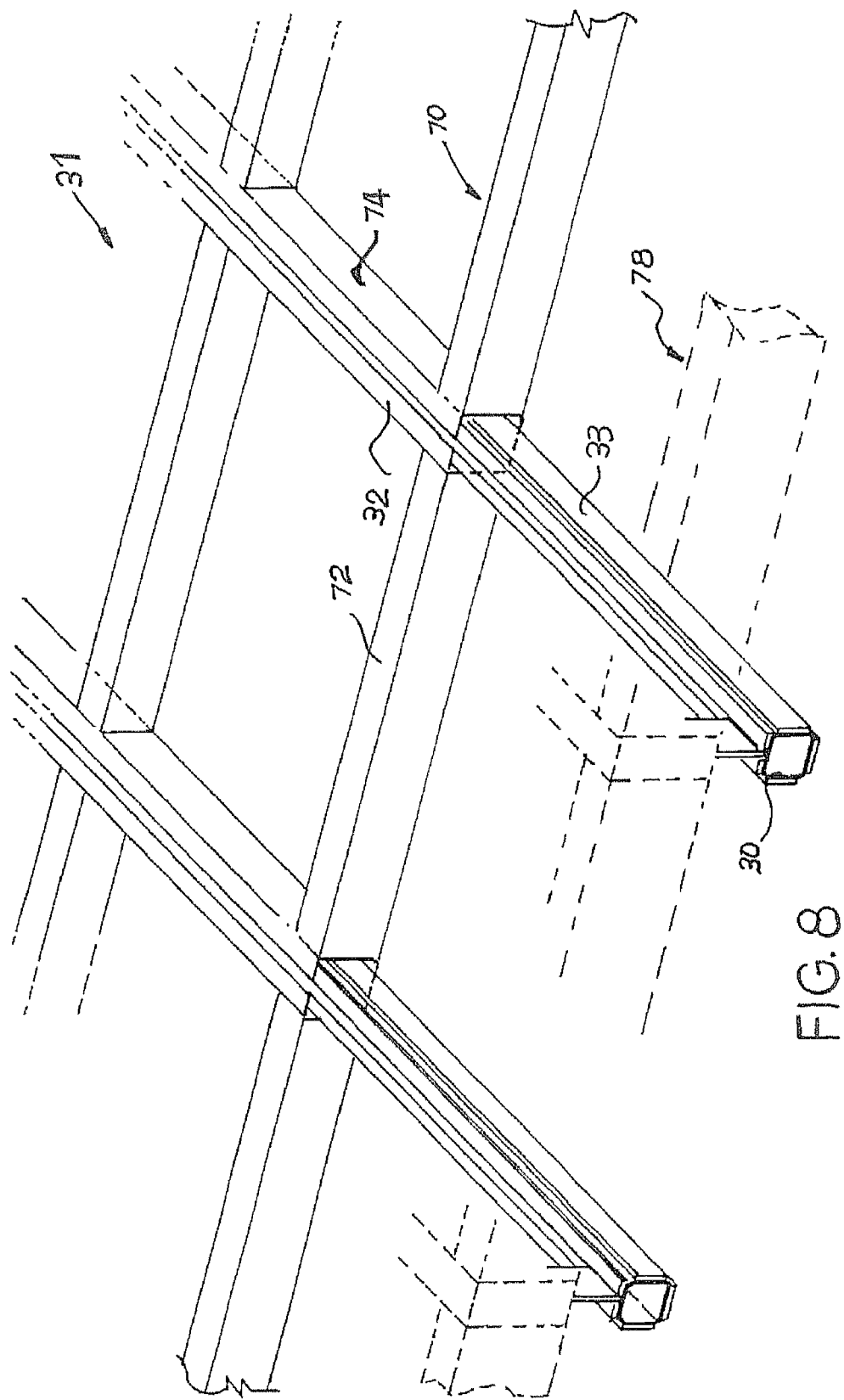
FIG. 8 is a three dimensional view of the male and female members of the slide out of FIG. 7 in the expanded position.
Figure 9:
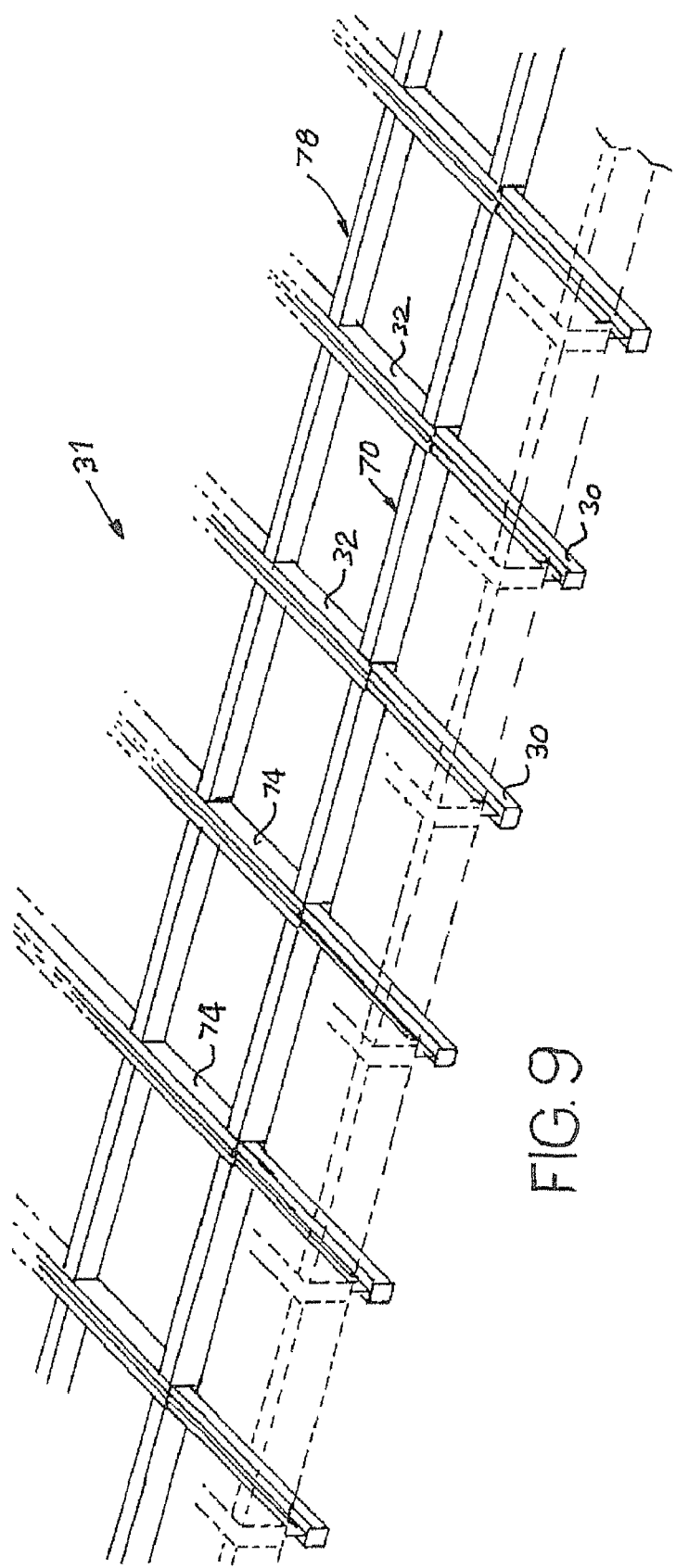
FIG. 9 is a three dimensional view of a plurality of male and female members in the expanded position.

In FIGS. 1 and 2 reference numeral 1 refers generally to a vehicle that is a motor home having two slide out body members 13, 14 in accordance with the invention.

The motor home 1 includes broadly a vehicle body 2 having a vehicle wall including two side wall sections and defining a vehicle interior. The vehicle interior is in turn divided up circumferentially into a front seat area having a front seat where a driver and passenger sit and a living area behind the front seat. The body 2 is mounted on four wheels 3 in the usual way and is powered by an engine typically a petrol or diesel engine located within the body 2 towards the front of the vehicle 1.

The motor home has front doors 4 providing access to the front seat on left and right sides respectively. It also has a side door 5 providing access to the living space rearward of the front seat. It also includes a rear door (not shown) providing access to a rear storage compartment.

The vehicle 1 also includes slide out body members 13 and 14 on each side of the vehicle body 2 rearward of the front seats.

Each slide out member 13, 14 extends across a side wall section of the vehicle body 2 rearward of the front seat and comprises a primary wall portion 15 and end walls 17 and 18 and a bottom portion 19 and a roof 20 extending transverse to the primary wall portion 15. Thus the walls 17 and 18 and bottom and roof 19 and 20 fit into openings defined by the side wall sections of the vehicle body. The internal space defined by the various wall components of the slide out member 13, 14 opens into the vehicle interior. Each slide out member 13, 14 is moveable between a retracted position in which the primary wall portion 15 of the member is broadly aligned with the side wall section of the vehicle body 2 as shown in FIG. 1 and an expanded condition when the primary wall portion 15 projects laterally outward from the vehicle body as shown in FIG. 2.

Generally, each slide out member 13, 14 will include a basic frame of aluminium tubing with a sheet material applied to this basic frame. In the illustrated embodiments the sheet material is fibreglass although other materials could also be used.

Each slide out member 13, 14 is supported for sliding displacement on the vehicle body 2 by a sliding arrangement 31 having support means in the form of a plurality of longitudinally spaced male and female members 30, 32 that are in engagement with each other. Each male member 30 is received within its associated female member 32 in a way that permits the male member 30 to slide relative to the female member 32.

In the illustrated embodiment each female member 32 is a square tube mounted on the vehicle body 2 defining a passage therein with an open end and a male member 30 in the form of a rod or tube on the slide out member 13, 14 that is received within the member 32 with a snug fit that permits sliding of the members relative to each other. While the cross-sectional shape of the passage and the male member in the illustrated embodiment are square it will be readily appreciated by persons skilled in the art that other complementary configurations could equally be used. The main thing is that the cross-sectional shape of the male and female members complement each other and provide a snug fit with the necessary support which does not permit any pivoting or rattling movement of the two members relative to each other.

The contact surfaces of the male member 30 are coated with a smooth coating to reduce friction with the female member 32 within the passage. In one form the coating is nylon or polyurethane although clearly many other low friction coatings could also be provided. The thickness in the coating in the illustrated embodiment is very thin being of the order of 1 mm. Similarly the male member is snugly received within the passage with a space of the order of 0.4 mm on each side. Thus the two members have a very close tolerance and this reduces rattling. The male and female guide members 30, 32 may be made out of aluminium.

Figure 10:
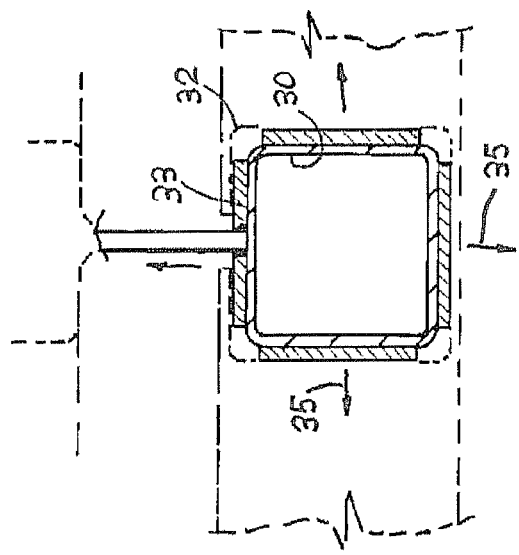
FIG. 10 is a sectional end view of engaged male and female members of FIG. 6.

FIG. 10 shows a sectional end view of the male member 30 inside the female member 32 having the four elongated polymer coating strips 33 applied to the male member 30. The polymer strips 33 have a thickness that provides a snug fit of the male member 30 inside the female member 32. Moreover, the polymer (or plastic) coating 33 has a thickness that is predetermined and selected to ensure a snug fit of the male member inside the female member with nothing more than a predetermined working clearance or tolerance between the male member 30 and the female member 32. In addition to the predetermined, or engineered, thickness of the coating, the polymer (or plastic) coating is also arrangement so as to permit longitudinal sliding of the male member 30 inside the female member 32 but at the same time to restrict movement of the male member 30 in any transverse direction (see arrows 35) within the passage defined by the female member, thereby to restrict rattling of the male member inside the female member in any transverse direction.

In addition to applying the polymer (or plastic) coating to achieving the snug fit and transverse movement restriction of the male member inside the female member, the mere physical properties of a polymer (or plastic) coating that is firmly adhered to the male member may also damp sound-board characteristics which a metallic male member and female member may possess, thus further reducing noise even if there is slightly induced transverse recursive collisions between the male member and the female member within the predetermine engineered tolerance between them.

Figure 11:
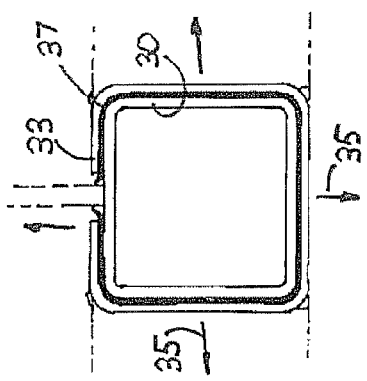
FIG. 11 is a sectional end view of engaged male and female members of the slide out that is coated with a different coating to that in FIG. 6.

FIG. 11 shows a male member 30 inside a female member 32 and a plastic coating 37 is applied to the male member 30. The plastic coating 37 in this embodiment extends in a single phase circumferentially around the male member 30, and also extends substantially along the whole length of the male member 30.

Figure 12:
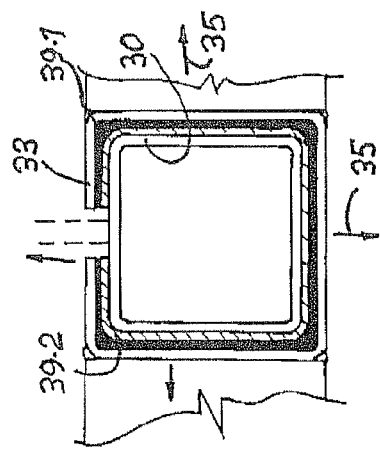
FIG. 12 is a sectional end view of engaged male and female members of the slide out that is coated with a different coating to that in FIGS. 10 and 11.

FIG. 12 shows a further embodiment in which a plastic coating 39.2 is applied to the male member 30 and another plastic coating is applied to the female member 33. Instead, the plastic coating can be applied to only the female member.

The chassis frame 70 forms part of the chassis for the vehicle body onto which the slide out 13, 14 is mounted. The chassis frame 70 includes a plurality of frame members 72, 74 forming the chassis frame. At least some of the frame members 74 form the female members 30. The chassis frame has a plurality of parallel frame members longitudinally spaced apart and a plurality of parallel transversely spaced apart frame members. In this example, some of the longitudinally spaced apart frame members thus form the female members 32. The longitudinal and transverse frame members all lie within a same plane.

Figure 13:
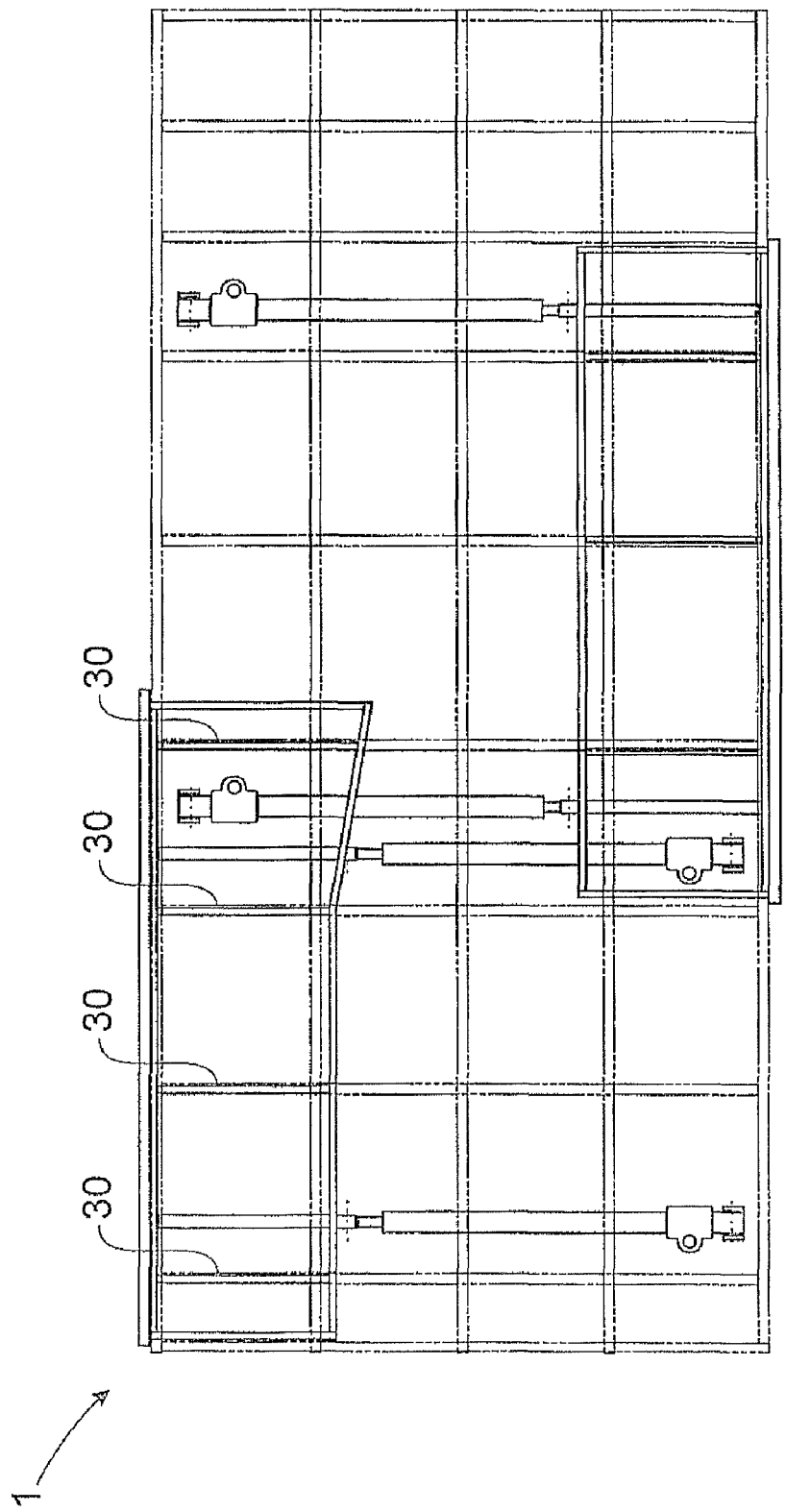
FIG. 13 is a sectional plan view of the chassis of the vehicle showing the slide outs in the retracted positions.
Figure 14:
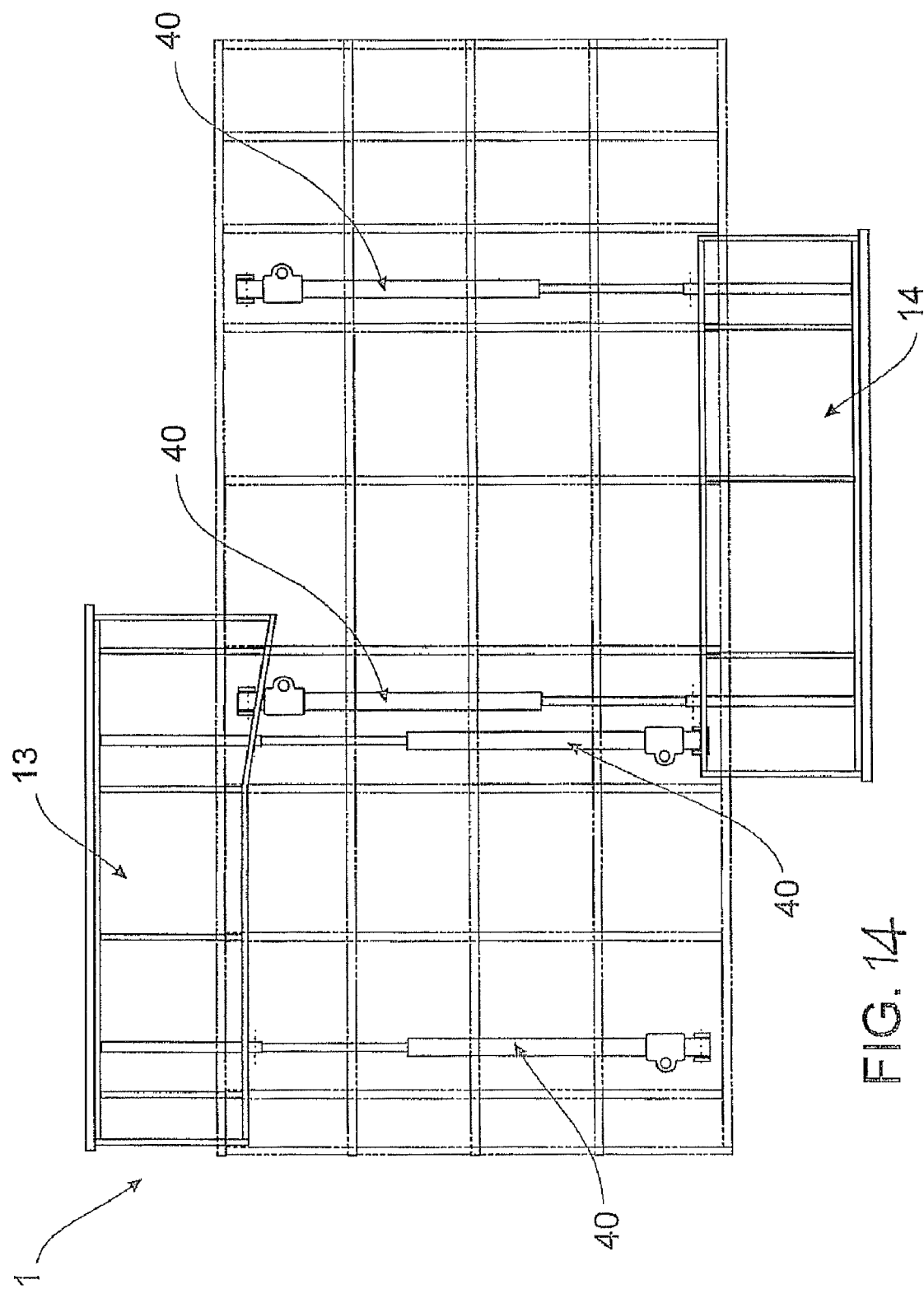
FIG. 14 is a sectional plan view of the chassis frame of the vehicle showing the slide outs in the expanded positions.
Figure 15:
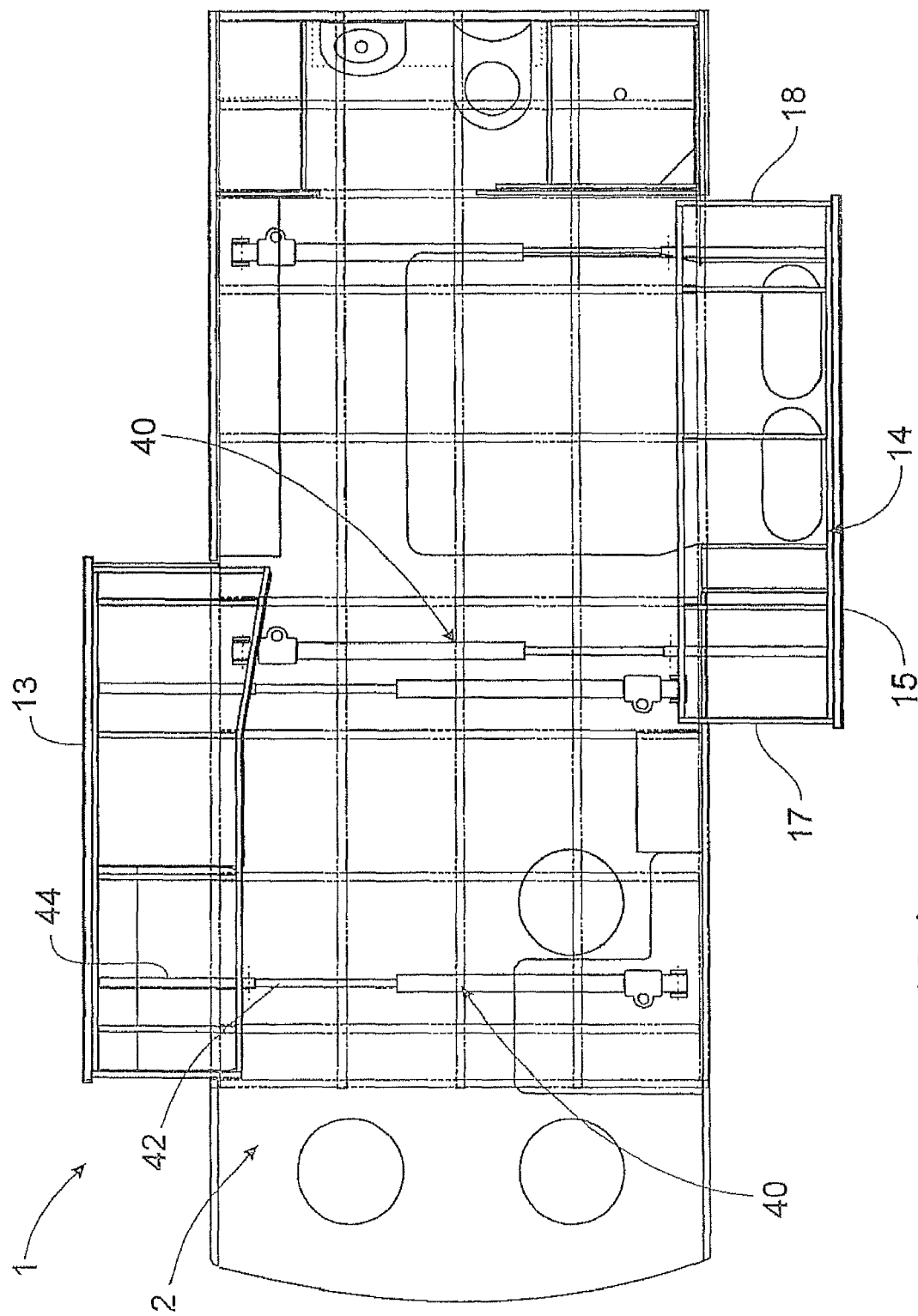
FIG. 15 is a sectional plan view of the chassis frame and of the vehicle showing the slide outs in the expanded positions.

As shown in FIGS. 13 and 15 each slide out member has four said male engaging members 30 spaced apart along the length of the slide out member 13, 14. This provides the necessary support for the slide out member 13, 14 on the vehicle body 2 in a way that permits the slide out member 13, 14 to move between said retracted and expanded positions. The members 30, 32 are located in a lower region of the slide out member and further members 30, 32 are not required towards the top of the slide out members 13, 14.

The sliding arrangement 31 includes an attachment member 76 fixedly attached on an upward facing wall of the male member 30 for attaching a slide out base 78 to the male member. The slide out base 78 includes a frame 80 onto which the slide out body is mounted. The female member 32 define a longitudinal slot 82 in its upward facing wall, and the attachment member 76 is in the form of a flange that is shaped and sized to slide along the slot 82 when the male member 30 and female member 32 are telescopically displaced.

The vehicle 1 also includes a drive for driving the slide out member 13, 14 between said retracted and expanded positions while it is supported by the male and female members 30, 32 as described above.

The drive is a linear actuator 40 with a shaft 42 that rotates to effect translational displacement of a passive actuator member that is a nut or sleeve 44 mounted over the shaft 42 along the shaft 42. The nut or sleeve 44 is held against rotation by its mounting on the slide out member 13, 14.

The shaft 42 is in the form of a rod having an external screw thread defined on its surface along its length. The nut 44 has a complementary internal screw thread that engages the screw thread on the rod 42 such that rotation of the shaft 42 relative to the nut 44 which is held against rotation effects linear movement of the nut 44 along the shaft 42.

In the illustrated embodiment the shaft 42 is mounted to the vehicle body 2 and the passive member that is a nut 44 is mounted to the slide out member 13, 14 so that rotation of the shaft produces the linear displacement that moves the slide out member 13, 14 between said retracted and expanded conditions.

There may be two said linear actuators 40 associated with each slide out member, e.g. one towards each end thereof. The linear actuators 40 may also be located in the services compartment, e.g. below the floor. Further the engaged male and female members 30, 32 that support the slide out body member on the vehicle body are also located in the services compartment beneath the floor.

The actuator 40 includes a drive in the form of an electric motor (not shown) for driving the shaft 42 to rotate. The motor is energized by power from a battery which conveniently can be provided by the standard battery within the vehicle that is used to supply electrical energy to other components within the vehicle such as the starter motor and the lights.

The actuator 40 may be provided with a travel limit for limiting movement in the form of limit switches to stop movement when each is in the retracted and expanded positions thereby limiting travel of the components beyond these positions.

The linear actuator 40 is particularly suitable for moving the slide out member 13, 14 between the retracted and expanded positions because its movements are very precise. Each turn of the shaft moves the nut only a very incremental amount and this enables the slide outs to be moved very precisely into the retracted and expanded conditions.

In addition each linear actuator 40 only occupies a small amount of space. Typically the actuators 40 will be positioned in proximity to the engaging male and female members 30, 32. Electrical cables (not shown) are required to electrically connect the actuator motor to the battery but these can be led through the vehicle in a very unobtrusive fashion and do not encroach on the available space in any real way. This is an advantageous feature in motor homes where space is at a premium.

The slide out member 13, 14 further includes a floor 50 positioned in between the roof 20 and the bottom 19 but closer to the bottom 19 than the roof 20. This floor 50 divides the space defined by the slide out member 13, 14 into a living space above the floor and a service compartment 52 between the floor 50 and the bottom 19. Thus the service compartment 52 is positioned beneath the living area underneath the floor 50. The vehicle 1 includes a service connector shown generally by reference numeral 53 extending from the vehicle body 2 to the associated service fittings in the vehicle slide out member 13, 14.

The illustrated service connector 53 comprises a plurality of flexible conduits 54 each of which carries a service from the main vehicle body 2 into the slide out member 13, 14. Each flexible conduit 54 has one end 55 that is operatively coupled to a service supply element on the vehicle body 2 and an opposed end 56 that is operatively coupled to the corresponding service receiving element on the vehicle slide out body member 13, 14. Conveniently each said service is received within a discrete flexible conduit 54.

The flexible conduits 54 are usually located in the service compartment 52 below the floor 50 and thus they are not visible to a person in the living area of the vehicle body 2.

The services that are provided through the services conduits may include: electricity for energizing appliances and lights, eg 12 V and 240 V, water for washing and cooking, gas for cooking and heating, and also drainage facilities for draining grey water from a kitchen sink, shower and/or a hand basin that needs to be removed from the slide out.

One such flexible conduit 54 is in the form of a flexible pipe that carries water to the slide out body member 13, 14. Another flexible conduit 54 is in the form of a flexible pipe that carries gas to the slide out. Another such flexible conduit contains flexible electrical cable for supplying electricity to the slide out body member 13, 14. Another flexible conduit 54 forms or contains a drain pipe that drains waste water from plumbing fitting such as a sink or basin in the slide out body member 13, 14.

Each flexible conduit 54 has sufficient length to accommodate movement of the slide out body member 13, 14 from the retracted to the expanded positions without a tensile stretching force being applied thereto. That is the conduit 54 has sufficient length such that it is not quite fully extended in the expanded position. The flexible nature of the conduits 54 and their sufficient length enables services to be provided in the slide out member 13, 14 notwithstanding that it undergoes a fair amount of movement in a lateral direction. Each conduit 54 also has sufficient flexibility to undergo a significant amount of bending when the slide out body member 13, 14 moves between the expanded and retracted conditions.

Further the compartment 52 beneath the floor 50, within which the flexible conduits 54 are received, is sized to receive the flexible conduits 54. That is the service compartment 52 accommodates with comfort all the extra length of the various service conduits 54 when the slide out body member 13, 14 is in the retracted position.

Figure 16:
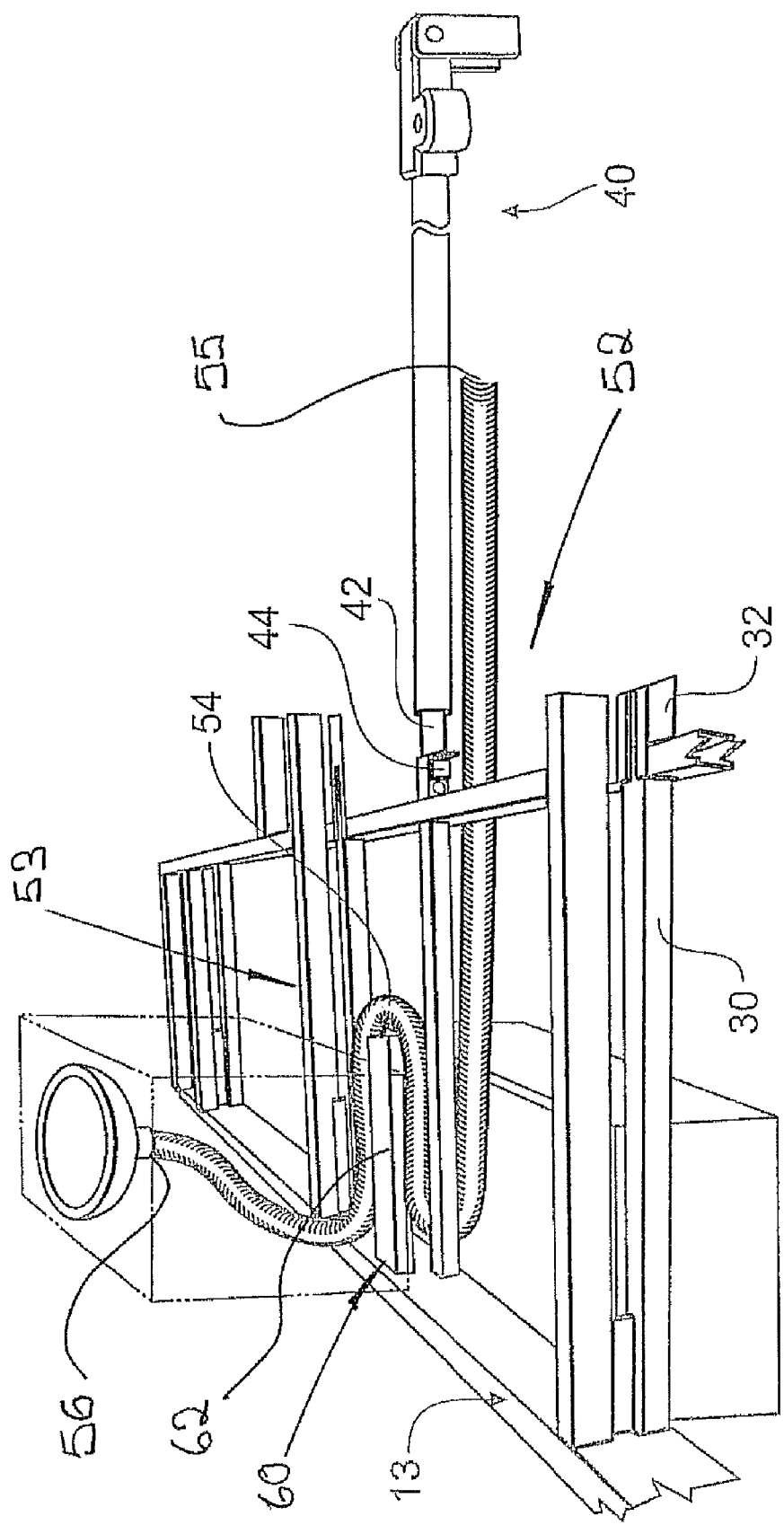
FIG. 16 is a three-dimensional view of the slide out member mounted on the chassis of a vehicle body with the slide out in the retracted position showing how the services on the slide out are connected to the vehicle body by means of a service connector.

The motor home 1 further includes a conduit organizer which is indicated generally by reference numeral 60 in the services compartment 52. The organizer 60 assists in guiding the conduits 54 to unfold in an organized fashion when the slide out body member 13, 14 is moved to the expanded position and to guide the conduits 54 to fold up in an organized fashion when the slide out body member 13, 14 is moved back to the retracted position. The conduit organiser 60 is shown clearly in FIGS. 16 and 17.

The conduit organizer 60 includes a partition member which is indicated generally by reference numeral 62 that extends into the services compartment 52, eg from the primary wall portion 15. The partition member 62 is shown clearly in FIGS. 16 and 17. In the illustrated embodiment the partition member 62 extends parallel to the end walls 17, 18 of the slide out body member 13, 14 or transverse to the primary wall portion 15 of the slide out body member 13, 14. Further the partition member 62 extends in from the primary wall portion 15 at least part of the width of the slide out body member 13, 14.

Figure 17:
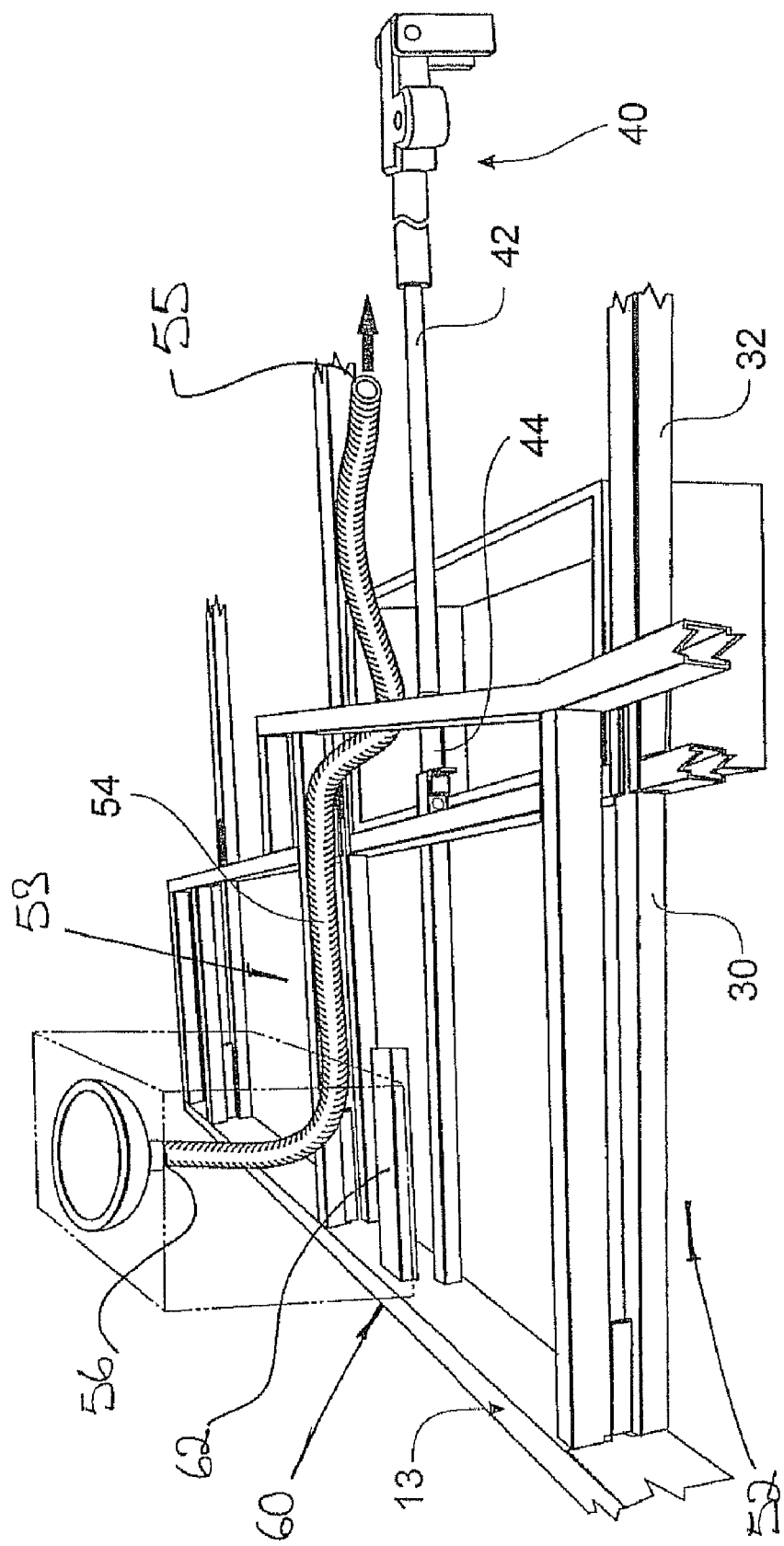
FIG. 17 is a three-dimensional view of the slide out member mounted on the chassis of a vehicle body with the slide out in the extended position showing how the services on the slide out are connected to the vehicle body by means of a service connector.
Figure 18:
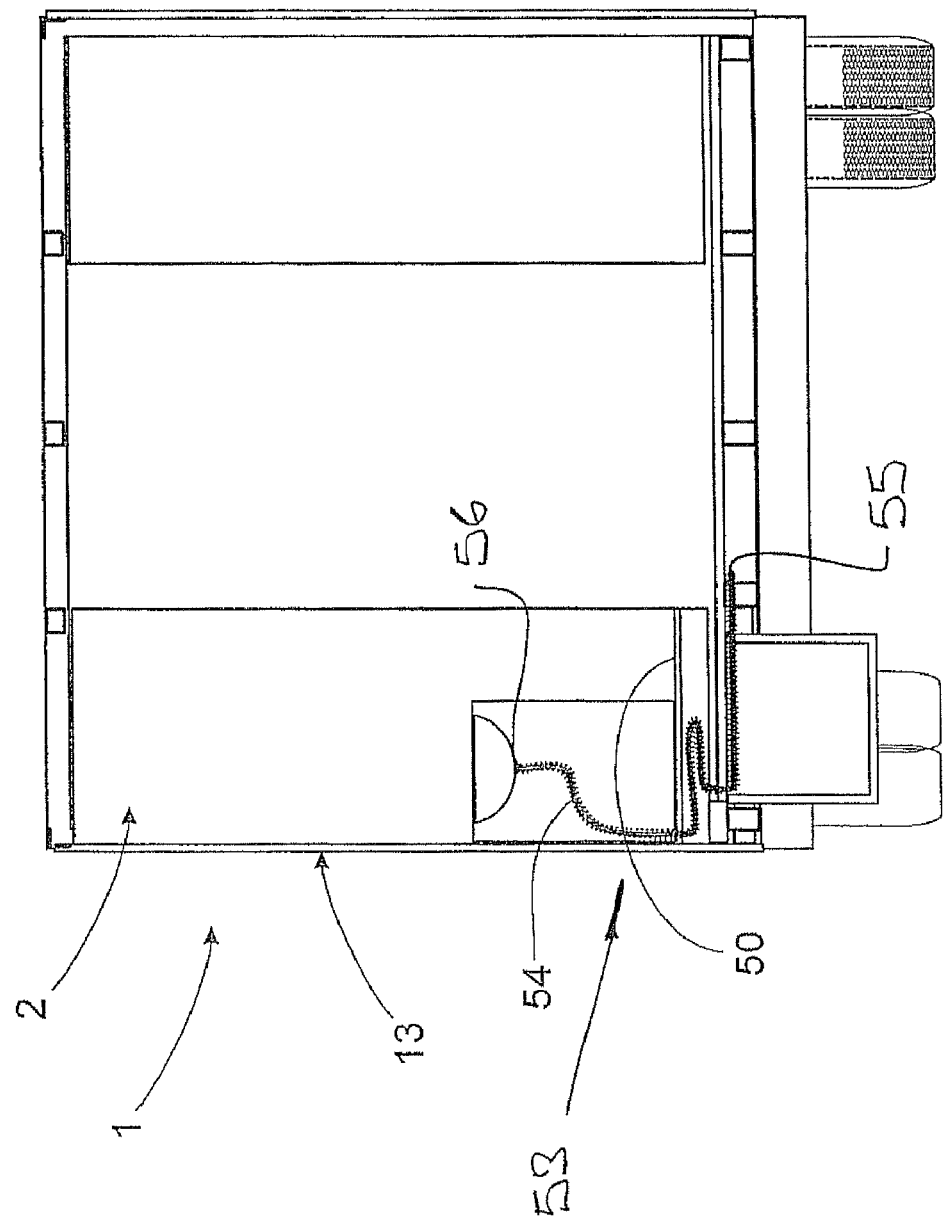
FIG. 18 is an end view of the slide out member and the vehicle body showing the arrangement of the services conduits in the services compartment when the slide out member is in the retracted position.

In use the organiser 60 assists the conduits 54 to fold up in an organised fashion when the associated slide out body member 13, 14 is moved to the retracted position. It does this by directing the flexible conduits 54 around the free end of the partition member 62 as shown in FIG. 10A and FIG. 11. When the slide out body member 13, 14 is moved to the expanded position the partition member 62 is displaced laterally outwardly and this permits the conduits 54 to straighten out and extend out to the service receiving element in its new position displaced laterally outward from the rest of the body 2. This is shown in FIG. 17.

Thus the service connector 53 and the conduit organiser 60 enables services such as wash basins and cooking facilities to be housed in the slide out 13, 14 where it is most convenient to house them because of the additional space. Very often a so called kitchen area of a motor home is located in the slide out because this forms a major section of the wall surrounding the interior space in a region which is reasonably accessible. A bedroom area may also be located in the slide out.

Generally the vehicle that is used for the motor home will be a commercially available light commercial vehicle such as a Mercedes™ van or cab chassis truck. This is then fitted out and modified as required to produce the motor home.

In use the slide out members 13, 14 are positioned in the retracted condition when the vehicle 1 is used to travel on a road. Any movement of the slide out members that is required to move these members 13, 14 to the retracted position will be carried out before the vehicle is started up for travel. Once in the retracted position the slide out members are received within each side of the vehicle body 2 and do not project outwardly proud of the vehicle body 2 to any significant extent. The width of the vehicle body 2 is broadly the same as that for normal light commercial vehicles that use the road. Certainly it is within the requirements for legal use of a public road.

Generally when the vehicle 1 is travelling the occupants of the vehicle will be seated on the front seat and will not occupy the rear living area of the interior space. In this condition the vehicle can be driven on the road in the normal way and used as a normal vehicle.

When the vehicle 1 taken off the road and it is desired to use it for camping and/or recreation (herein referred to as recreational mode) it is parked at a suitable site in a stationary position. The linear actuators 40 are then used to move the slide outs 13, 14 on each side to their expanded condition. This is accomplished by using a manual control and as described above the energy to do this is provided by the vehicle battery. The slide outs 13, 14 are moved out to their expanded position by the linear actuators 40 in a short space of time. The movement of the linear actuators 40 is very precise and this moves the slide outs 13, 14 into exactly the same expanded position each time. The limit switches associated with the actuators stop the slide outs 13, 14 very precisely in their correct position.

Once in the expanded position the slide out members 13, 14 considerably enlarge the interior space defined in the vehicle body 2 particularly in the lateral direction or direction of width. Thereafter the interior space of the vehicle body and particularly the living space can be used for various activities such as cooking, cleaning and washing in the usual way for a caravan or the like. The slide outs 13, 14 give increased lateral width which is a key dimension to make the living area as utile as possible. This enables the routine activities such as cooking, washing and eating to be carried out in greater comfort than otherwise would be the case.

The additional area created by moving the slide outs laterally outwardly may be used to contain a kitchen facility in the motor home. That is a sink with taps may be mounted to the movable slide out. Further a gas fired cook top may be mounted to the slide out as well as electrical appliances and electrical power points. Another slide out may be used to form part of a bedroom.

By having slide outs on both sides of the vehicle the width of the living space can be increased from 1.8 m to about 3 to 4 m.

An advantage of the slide out described above with reference to the drawings is that the male member is received within the female member with a snug but sliding fit to guide movement of the slide out between the retracted and expanded positions.

The plastic coating is applied to the male or female member to restrict movement of the male or female member relative to each other in any transverse direction. Further, advantageously, the plastic properties of the coating may damp soundboard characteristics of the metallic male and female members. This further reduces noise that may have otherwise been created by collusion of the male and female member, even within the small tolerance between them. The close tolerance means that there cannot be much movement or rattling between the two members. This is advantageous because the vehicle travels on roads in use, including rough roads and if the male and female members are not tightly held together they will shake around and rattle. Further a very precise mechanism for moving the slide out relative to the vehicle body is required for this application and these male and female members provide this.

Another advantage of the support provided by the male and female members is that they occupy minimal space and in this application space is at a premium.

By contrast if the usual roller mechanism is used of the type which are found on drawers or the like there will be a substantially looser fit and associated rattling. This will generate noise and will also shorten the life of the mechanism. In addition it is difficult to stop the rattling because the rollers are not readily accessible. Another disadvantage of the roller mechanism is that it occupies more space than the mechanism using male and female members shown in the drawings.

Another advantage of the slide out described above is that it is moved in and out by a linear actuator which is capable of very precise movement. It can be very accurately moved to the same position each time it is displaced into the expanded condition. For this application it is obviously desirable that the slide out be moved to the same position each time. A further advantage of the linear actuator is that it is of very compact construction and only occupies a small amount of space. Again this is important in a motor home where space is at a premium. A yet further advantage is that the shaft of the linear actuator is rotated by an electric motor which is driven off the vehicle battery. Again this is very efficient because it uses an existing battery. Further the electrical wiring from the battery to the motor does not use up a significant amount of space.

By contrast if a hydraulic system was used it would require hydraulic pipes from the hydraulic drive to the slide outs and a hydraulic drive piston and cylinder to actually drive the hydraulic movement. Further a pump would be required for the hydraulic circuit. Yet further its movements would not be as precise.

A further advantage of the slide out described above is that it can provide services such as water, gas and electricity on the slide out body member instead of the fixed part of the vehicle body. This opens up many options in terms of the layout of the fittings within the motor home that would not exist if you could not do this. It does this by having a services compartment beneath the floor and flexible conduits connecting the services from the vehicle body to the slide out in the services compartment. Further by having the services within flexible conduits having sufficient length, movement of the services conduits together with the slide out between the retracted and expanded conditions is enabled. Further the slide out has a partition that helps to organize these cables and direct their movement as the slide out moves between the retracted and expanded conditions. This is beneficial because it is highly advantageous to be able to provide cooking and washing facilities and the like in the slide out and the illustrated embodiment does this in a way that will achieve reliable operation.

A particularly limited dimension in a motor home is the lateral width of the vehicle. Accordingly it would clearly be advantageous if the motor home could be adapted to be able to create a wider living area when the motor home was parked and transformed into their recreational or camping mode in a way that was trouble free, reliable and did not impose a requirement for additional drive systems which in turn used up more of the precious space within the vehicle body.

A yet further advantage of the slide out members described above is that they are made of aluminium and as such are light and strong. This helps to reduce the overall weight of the vehicle. A further weight reduction is achieved by forming the female members as part of the chassis frame, as apposed to having separate female members mounted on the chassis frame.

It will of course be realized that the above has been given only by way of illustrative example of the invention and that all such modifications and variations thereto as would be apparent to persons skilled in the art are deemed to fall within the broad scope and ambit of the invention as is herein set forth.

The invention claimed is:

1. A sliding arrangement for supporting a slide out body member of a slide out on a vehicle body in a way that permits the slide out body member to slide relative to the vehicle body between an expanded and a retracted position, which sliding arrangement includes:
   at least one female member mounted on one of the slide out body member and the vehicle body, the female member having an internal surface defining a passage open at one end, the passage extending in the direction in which the slide out body member is to slide relative to the vehicle body; and
   a male member on the other one of the slide out member and the vehicle body, the male member being slidably received within the open end and passage of the female member, the male member having contact surfaces along the length thereof that face outwardly transverse to the longitudinal axis,
wherein the contact surfaces of the male member or the internal surface of the female member is coated with a polymer coating having a thickness that is selected to achieve a snug fit of the male member within the passage of the female member, the polymer coating inhibiting transverse movement of the male member within the female member and rattling of the male and female members.

2. The sliding arrangement of claim 1, wherein the polymer coating is applied to the contact surfaces of the male member.

3. The sliding arrangement of claim 2, wherein the polymer coating extends along substantially the full length of the contact surfaces of the male member.

4. The sliding arrangement of claim 3, wherein the polymer coating extends as a continuous phase along the full length of the male member.

5. The sliding arrangement of claim 1, wherein the female member/s comprises a tube of unitary construction, and the male member/s comprises a complementary rod or tube of unitary construction shaped to be received with the female member/s.

6. The sliding arrangement of claim 1, wherein the female member comprises a square tube and the male member comprises a square tube having four contact surfaces, and the polymer coating is applied to each said contact surface.

7. The sliding arrangement of claim 1, wherein the polymer coating is of a polyamide material or a polyurethane material.

8. The sliding arrangement of claim 1, wherein each of the male and female members is made out of aluminium.

9. The sliding arrangement of claim 1, wherein the female member/s are mounted on the vehicle body and the male member/s are mounted on the slide out member.

10. The sliding arrangement of claim 1, wherein there are more than two said pairs of engaging male and female members along the length of the slide out member.

11. The sliding arrangement of claim 1, wherein the drive means includes at least one of a linear actuator, a hydraulics system including a piston and cylinder, and an air or pneumatic system including an air ram or ratchet and pawl.

12. The sliding arrangement of claim 11, wherein the drive means includes at least one linear actuator with a shaft operatively mounted onto the vehicle body or the slide out body member and a passive actuator element defining an opening through which the shaft of the linear actuator is passed, mounted on to the other of the vehicle body and the slide out body member, whereby rotation of the shaft relative to the passive actuator element effects translational displacement of the passive actuator element in an axial direction along the shaft and thereby lateral displacement of the slide out body member relative to the vehicle body.

13. The sliding arrangement of claim 12, wherein the shaft of the linear actuator has the slide out member mounted thereto and is mounted on the vehicle body.

14. The sliding arrangement of claim 12, wherein the passive actuator element comprises a nut mounted on the slide out body member in such a way that it is held against rotation by the slide out body member.

15. The sliding arrangement of claim 14, wherein the linear actuator includes travel limiting means for limiting the travel of the nut along the shaft in each direction, said travel limiting means including limit switches at each end of the range of travel.

16. The sliding arrangement of claim 12, wherein the drive means includes an electric motor.

17. The sliding arrangement of claim 16, further including means for energising the motor in the form of a battery.

18. A vehicle having a slide out, the vehicle comprising:
   a vehicle body having a vehicle wall including two side wall sections and defining a vehicle interior;
   at least one slide out body member extending across an opening in a side wall section of the vehicle body that is capable of movement between a laterally expanded position during recreational use of the vehicle and a retracted position during use of the vehicle for travel on the roads, the slide out body member having a primary wall portion for covering at least a portion of the side wall section of the vehicle body and the body member also including end walls and a bottom and roof extending transverse to the primary wall portion so that the space defined by the slide out member opens into and forms part of the vehicle interior;
   a support means for supporting the body member on the body of the vehicle in a way that permits the slide out body member to slide relative to the body of the vehicle between the expanded and retracted positions, the support means comprising at least one female member having an internal surface defining a passage open at one end, on one of the slide out body member and the vehicle body, and a male member having a longitudinal axis on the other one of the slide out member and the vehicle body that is slidably received within the open end and passage of the female member, the male member having contact surfaces along the length thereof that face outwardly transverse to the longitudinal axis, wherein the contact surfaces of the male member or the internal surface of the female member is coated with a polymer coating having a thickness that is selected to achieve a snug fit of the male member within the passage of the female member whereby to inhibit transverse movement of the male member within the female member and rattling of the male and female members; and a drive means for driving the body member between said expanded and retracted positions on said support means.

19. The vehicle of claim 18, wherein the polymer coating is applied to the contact surfaces of the male member.

20. The vehicle of claim 19, wherein the polymer coating extends along substantially the full length of the contact surfaces of the male member.

21. The vehicle of claim 20, wherein the polymer coating extends as a continuous phase along the full length of the male member.

22. The vehicle of claim 18, wherein the female member/s comprises a tube of unitary construction, and the male member/s comprises a complementary rod or tube of unitary construction shaped to be received with the female member/s.

23. The vehicle of claim 18, wherein the female member comprises a square tube and the male member comprises a square tube having four contact surfaces, and the polymer coating is applied to each said contact surface.

24. The vehicle of claim 18, wherein the polymer coating is of a polyamide material or a polyurethane material.

25. The vehicle of claim 18, wherein each of the male and female members is made out of aluminium.

26. The vehicle of claim 18, wherein the female member/s are mounted on the vehicle body and the male member/s are mounted on the slide out member.

27. The vehicle of claim 18, wherein there are more than two said pairs of engaging male and female members along the length of the slide out member.

28. The vehicle of claim 18, wherein the drive means includes at least one of a linear actuator, a hydraulics system including a piston and cylinder, and an air or pneumatic system including an air ram or ratchet and pawl.

29. The vehicle of claim 28, wherein the drive means includes at least one linear actuator with a shaft operatively mounted onto the vehicle body or the slide out body member and a passive actuator element defining an opening through which the shaft of the linear actuator is passed, mounted on to the other of the vehicle body or the slide out body member, whereby rotation of the shaft relative to the passive actuator element effects translational displacement of the passive actuator element in an axial direction along the shaft and thereby lateral displacement of the slide out body member relative to the vehicle body.

30. The vehicle of claim 29, wherein the shaft of the linear actuator has the slide out member mounted thereto and is mounted on the vehicle body.

31. The vehicle of claim 29, wherein the passive actuator element comprises a nut mounted on the slide out body member in such a way that it is held against rotation by the slide out body member.

32. The vehicle of claim 31, wherein the linear actuator includes travel limiting means for limiting the travel of the nut along the shaft in each direction, said travel limiting means including limit switches at each end of the range of travel.

33. The vehicle of claim 29, wherein the drive means includes an electric motor.

34. The vehicle of claim 33, further including means for energising the motor in the form of a battery.

35. The vehicle of claim 29, wherein each slide out body member includes two said drive means.

36. The vehicle of claim 35, wherein the vehicle includes slide out members on each of left and right hand sides of the vehicle.

37. The vehicle of claim 18, wherein the vehicle is a motor home.

38. A slide out body member for mounting to a vehicle body, the slide out member comprising:

a primary wall portion for covering over the side of the vehicle and also end walls and a bottom and roof extending transverse away from the primary wall portion in a direction into the vehicle body so as to enclose an interior space of the slide out body member within an interior of the vehicle body, the slide out body member being capable of movement between a laterally expanded position during recreational use of the vehicle and a retracted position during use of the vehicle for travel on the roads;

a support means for supporting the body member on the body of the vehicle in a way that permits the slide out body member to slide relative to the body of the vehicle between the expanded and retracted positions, the support means comprising at least one female member having an internal surface fining a passage open at one end, on one of the slide out body member and the vehicle body, and a male member having a longitudinal axis on the other one of the slide out member and the vehicle body that is slidably received within the open end and passage of the female member, the male member having contact surfaces along the length thereof that face outwardly transverse to the longitudinal axis, wherein the contact surfaces of the male member or the internal surface of the female member is coated with a polymer coating having a thickness that is selected to achieve a snug fit of the male member within the passage of the female member whereby to inhibit transverse movement of the male member within the female member and rattling of the male and female members; and a drive means for driving the body member between said expanded and retracted positions on said support means.

\* \* \* \* \*